United States Patent
Chapman, III et al.

(10) Patent No.: US 10,614,779 B2
(45) Date of Patent: Apr. 7, 2020

(54) INTERACTIVE PROJECTION SYSTEM

(71) Applicant: Drive Innovations, LLC, Louisville, TN (US)

(72) Inventors: Harold C. Chapman, III, Knoxville, TN (US); Matthieu Huszar, Knoxville, TN (US)

(73) Assignee: Drive Innovations, LLC, Louisville, TN (US)

(*) Notice: Subject to any disclaimer, the term of this patent is extended or adjusted under 35 U.S.C. 154(b) by 64 days.

(21) Appl. No.: 15/923,896

(22) Filed: Mar. 16, 2018

(65) Prior Publication Data

US 2018/0268784 A1 Sep. 20, 2018

Related U.S. Application Data

(60) Provisional application No. 62/472,018, filed on Mar. 16, 2017.

(51) Int. Cl.

| | |
|---|---|
| *G03B 21/14* | (2006.01) |
| *H04N 9/31* | (2006.01) |
| *G09G 5/377* | (2006.01) |
| *G06T 5/00* | (2006.01) |
| *G06F 3/14* | (2006.01) |

(Continued)

(52) U.S. Cl.
CPC .......... *G09G 5/377* (2013.01); *G06F 3/1431* (2013.01); *G06T 5/006* (2013.01); *G09G 3/001* (2013.01); *H04N 9/3144* (2013.01); *H04N 9/3179* (2013.01); *H04N 9/3194* (2013.01); *G03B 21/145* (2013.01); *G03B 21/16* (2013.01); *G06F 3/1446* (2013.01); *G09G 2300/026* (2013.01); *G09G 2320/0693* (2013.01); *G09G 2340/0464* (2013.01); *G09G 2340/12* (2013.01); *G09G 2360/04* (2013.01); *G09G 2370/04* (2013.01); *G09G 2370/06* (2013.01)

(58) Field of Classification Search
CPC .... G03B 21/147; G09G 5/377; H04N 9/3179; H04N 9/3185; H04N 9/3188; H04N 9/3194

See application file for complete search history.

(56) References Cited

U.S. PATENT DOCUMENTS

| | | |
|---|---|---|
| 7,872,643 B2 | 1/2011 | Galligan et al. |
| 8,259,094 B2 | 9/2012 | Galligan et al. |
| 8,896,688 B2 | 11/2014 | Blanton et al. |

(Continued)

*Primary Examiner* — Ryan D Howard
(74) *Attorney, Agent, or Firm* — Knox Patents; Thomas A. Kulaga

(57) ABSTRACT

System for an interactive projection system for adjusting projected images. The system includes a paired projector and camera, a workstation, and processor. The processor acquires an initial image of the surface via the camera and communicates information on the image to the workstation. A user creates a graphic at the workstation and manipulates the graphic to obtain a selected position, orientation, and/or scaling of a manipulated graphic. The manipulated graphic is projected by the projector onto the surface. The camera communicates an updated image of the surface, including the projected graphic, to the workstation. The user identifies points on the manipulated graphic and corresponding points on the projected graphic, thus allowing for the projected graphic to be adjusted accordingly.

20 Claims, 16 Drawing Sheets

(51) Int. Cl.
  *G09G 3/00*   (2006.01)
  *G03B 21/16*  (2006.01)

(56) References Cited

U.S. PATENT DOCUMENTS

2006/0001839 A1   1/2006  Beardsley et al.
2010/0128229 A1   5/2010  Laboris
2013/0162607 A1   6/2013  Ichieda
2015/0042964 A1*  2/2015  Furui .................... G03B 21/53
                                               353/69
2015/0102993 A1   4/2015  Gadjali et al.

* cited by examiner

INTERACTIVE PROJECTION SYSTEM

CROSS-REFERENCE TO RELATED APPLICATIONS

This application claims the benefit of provisional Application No. 62/472,018, filed Mar. 16, 2017.

STATEMENT REGARDING FEDERALLY SPONSORED RESEARCH OR DEVELOPMENT

Not Applicable.

BACKGROUND

1. Field of Invention

This invention pertains to image projector systems. More particularly, this invention pertains to a system for interactively transmitting and manipulating projector images based on remotely viewing such images.

2. Description of the Related Art

Projectors are commonly used to project images onto surfaces such as houses, natural outdoor surfaces, advertising billboards, real estate, and restaurant walls for menus. The projected images are often misplaced when initially projected and require manual adjustment of the projector. The projected images are often the wrong size, requiring movement of the projector or reprogramming of the image. The projected images are often subject to distortion, for example from a keystone effect or an angled surface. The projected images are often subject to multiple distortions because the projection surface is uneven.

BRIEF SUMMARY

According to one embodiment of the present invention, an interactive projection system for adjusting projected images is provided. In one embodiment, the system is remotely controlled through the Internet.

In one embodiment, the system includes a user workstation, a processor, a projector, and a camera. The projector and camera interact with a surface. The processor is in communication with the workstation, the camera, and the projector.

The projector is capable of projecting an image on the surface. In one embodiment, the surface is irregular, for example, the surface has two or more non-coplanar portions. The camera is capable of acquiring an image of the surface. The workstation is an interactive interface for the processor. The workstation allows a user to view images acquired from the camera and specify the location and scaling of graphics to be projected.

The projector is positionable such that at least a portion of the projector's projection area is on the surface. The camera is positionable such that at least a portion of the camera's field of view is on the surface. The camera's field of view includes the projection area that is on the surface. In one embodiment, the camera's field of view on the projection area is equal to or greater than the projector's projection area on the surface.

The processor acquires an image of the surface from the camera. The processor also acquires a graphic that is desired to be projected on the surface. The workstation is manipulated by a user to specify a location, orientation, and/or size of the graphic relative to the surface to produce a projector graphic. The processor sends the projector graphic to the projector and the projector graphic is displayed on the surface. The processor acquires an updated image from the camera showing the surface with the projected graphic displayed thereon. The processor adjusts the projector graphic with the representation of the projector graphic in the updated image to produce a new projector graphic. The processor sends the new projector graphic to the projector and the new projector graphic is displayed on the surface, replacing the previous version of the projector graphic. The processor steps of acquiring an updated image, merging the images, and sending a new updated projector graphic are repeated until the projector graphic and the representation of the projector graphic in the updated image are merged.

In one embodiment the workstation provides an interactive interface to the processor where a user can view and manipulate the image acquired from the camera, the graphic, the projector image, and the updated image. For example, the user selects a graphic file or creates a graphic image that the process is able to acquire as the graphic. The user is able to manipulate the graphic to position, orient, and scale the graphic relative to the image and/or updated image to produce a projector graphic.

In one embodiment, the correction process for the projector graphic goes through multiple iterations until the graphic placed on the workstation view of the surface matches the projector graphic on the actual surface. In one embodiment, the processor selects the points and corresponding points during each iteration of the correction process, thereby automating and speeding up the correction process.

In one embodiment, the only adjustment to the graphic is size and location, and there are two points associated with the graphic and two corresponding points associated with the projector graphic. In another embodiment, the adjustment to the graphic includes reducing distortion of the projected image, and there are four points and four corresponding points. In another embodiment, the surface includes a plurality of non-coplanar portions, and there are four points and four corresponding points for each non-coplanar portion. In one embodiment, there are multiple projectors and camera pairs. Each pair is coupled to its own processor. All of the camera/projector processors are coupled to a single processor, which coordinates individually the various graphics being projected by each camera. In one embodiment, the coupling is through a computer network such as the Internet.

In one embodiment, the camera and projector are housed in a single enclosure. In one such embodiment, the enclosure is weather-resistant, thereby allowing the camera and projector to be used outside, for example, where the surface is on the side of a building. In another embodiment, the camera and projector are housed in separate enclosures, where the camera is located at substantially the same location as a typical viewer of the projected graphic. In various embodiments, the enclosure includes a fan, a heat exchanger, and/or a heat sink to transfer heat generated from the projector away from the enclosure.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

An interactive projection system 100 is disclosed. The system is generally indicated as 100, with particular embodiments and variations shown in the figures and described below having an alphabetic suffix, for example, 100-A, 100-B, 100C. Various components are illustrated both generically and specifically in the figures and in the following description. For example, the processors 104-A, 104-B, and 104-C are discussed individually and separately to ensure clarity. The processor 104, when referred to collectively, is referenced without the alphanumeric suffix.

Figures 1, 2:
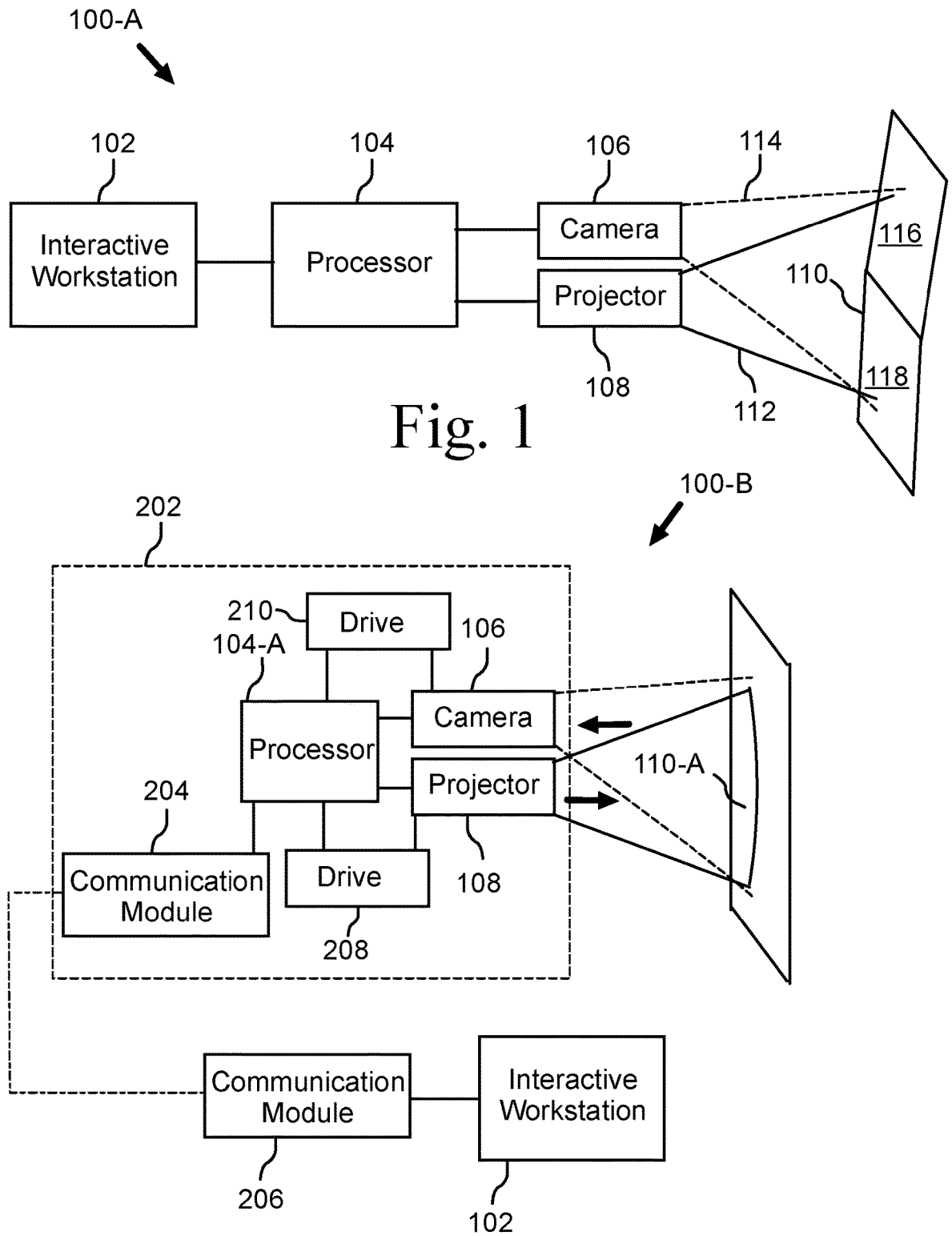
FIG. 1 is a simplified diagram of an embodiment of an interactive projection system and a projection surface.
FIG. 2 is a simplified diagram of another embodiment of an interactive projection system and a projection surface, where the system includes drives for the camera and projector.

FIG. 1 illustrates a system 100-A for interactively manipulating images from a projector 108 that are projected onto a surface 110. The system 100-A includes an interactive work station 102 in communication with a processor 104. The processor 104 in turn is in communication with a camera 106 and a projector 108. The camera 106 and projector 108 are aligned relative to one another such that the projection area 112 of the projector 108 and the view area 114 of the camera 106 overlap on a surface 110.

In the illustrated embodiment, the surface 110 for projection is uneven or irregular. For example, the surface 110 includes two portions 116, 118, that are not co-planar. In other embodiments, the surface 110 is planar, at an oblique angle to the camera 106 and/or projector 108, and/or has an irregular configuration.

The projector 108 has an output that is a projection of an image and/or video. The projector 108 has an input that receives data of an image and/or a video that is projected from the output of the projector 108. The projector 108 is capable of projecting images within a projection area 112 onto the surface 110. In one embodiment, the projector 108 projects still images. In another embodiment, the projector 108 projects videos. In one embodiment, the projector 108 is capable of projecting images, in focus, onto an uneven or irregular surface.

The camera 106 has an input that is an optical representation of whatever is in the view area 114. The camera 106 has an output that includes image and/or video data representative of the input to the camera 106. The camera 106 is capable of viewing the surface 110. The camera 106 is capable of acquiring images of the surface 110. In the illustrated embodiment, the view area 114 of the camera 106 on the surface 110 is substantially equal to or greater than the projection area 112 on the surface 110. In this way the camera 106 provides a view of any images projected by the projector 108 on the surface 110. The view area 114 of the camera 106 on the surface 110 encompasses the projection area 112 on the surface. In various embodiments, the camera 106 is capable of acquiring still images and/or videos. The camera 106 is capable of viewing simultaneously non-coplanar portions 116, 118 of the surface 110. In one embodiment, the camera 106 is capable of viewing in focus portions 116, 118 at varying distances.

The workstation 102 communicates with the processor 104. The workstation 102 is interactive and allows a user to view an output from the processor 104 and provide inputs to the processor 104. The workstation 102 enables a user to select and manipulate images for the projector 108 to project on to the surface 110. In various embodiments, the work station 102 is a smart phone, mobile device, a laptop, a desktop computer, or other device that allow user interaction with the processor 104. In one such embodiment, the workstation 102 is a control panel and view screen proximate to the camera 106 and projector 108.

The processor 104 receives information from the camera 106 and the workstation 102. The processor 104 sends information to the projector 108 to project images.

As used herein, the processor 104 should be broadly construed to mean any computer or component thereof that executes software. In various embodiments, each one of the processors 104 is one of a general purpose computer processor or a specialized device for implementing the functions of the invention. The processors 104 each include a memory medium that stores software and data, a processing unit that executes the software, and input/output (I/O) units for communicating with external devices. The input component receives input from external devices, such as the camera 108 and workstation 102. The output component sends output to external devices, such as the projector 108 and the workstation 102. The storage component stores data and program code. In one embodiment, the storage component includes random access memory and/or nonvolatile memory. Although the processor 104 is illustrated in FIG. 1 as a single unit, the illustrated single processor 104 should also be broadly construed to encompass multiple physical processors in communication with one another.

FIG. 2 illustrates an embodiment of a system 100-B for manipulating projected images where the system 100-B includes drives 210, 208 for the camera 106 and projector 108. The projector 108 and camera 106 are in an enclosure 202. A processor 104-A is in the enclosure 202. A drive 208 for the projector 108 is in the enclosure 202. The drive 208 is controlled by the processor 104-A to move the projector 108 in two perpendicular axes aligned with the projection area 112. In this way, the projector 108 is aimed so that the projection area 112 covers a specified portion of the surface 110-A. A drive 210 for the camera 106 is in the enclosure 202 to move the camera 106 in two perpendicular axes aligned with the view area 114. In other embodiments, one or both of the drives 208, 210 are controlled by the processor. In yet another embodiments, one or both of the camera 106 and/or the projector 110 are manually adjusted such that the projection area 112 and view area 114 overlap on a desired portion of the surface 110-A.

A communication module 204 is in the enclosure 202. The communication module 204 for the various components 104-A, 106, 108, 208, 210 in the enclosure 202 communicates with a second communication module 206 that is connected to the workstation 102. In various embodiments, the communication modules 204, 206 use one or more of a wireless connection, a wired connection, a LAN connection, and/or an Internet connection to communicated between the modules 204, 206.

The camera 106 and projector 108 are aligned in essentially the same direction such that the view area 114 of the camera 106 substantially overlaps the projection area 112 of the projector on the surface 110-A.

The processor 104-A is in communication with the drive 210 that controls the motion of the camera 106. The processor 104-A is programmed to execute instructions that direct the drive 210 to move the camera 106 in a desired and selected direction. The processor 104-A is in communication with the drive 208 that controls the motion of the projector 108. The processor 104-A is programmed to execute instructions that direct the drive 208 to move the projector 108 in a desired and selected direction. In this way the view area 114 and/or the projection area 112 are moved into a desired and selected manner. For example, when the enclosure 202 containing the camera 106 and projector 108 is placed in service, any misalignment of the camera 106 and projector 108 is readily corrected by controlling the drives 210, 208, respectively.

The processor 104-A is in communication with the camera 106. The processor 104-A is programmed to acquire images from the camera 106.

The processor 104-A is in communication with the projector 108. The processor 104-A is programmed to provide images to the projector 108 for projection.

The processor 104-A is in communication with the communication module 204 inside the enclosure 202. The communication module 204 transmits and receives information from the communication module 206 that is in communication with the workstation 102.

In one embodiment, the enclosure 202 is weatherproof. The enclosure 202 is comprised of a hard, rigid material, for example, steel. In one embodiment, the walls of the enclosure 202 include one or more transparent windows through which the projector 108 and camera 106 are pointed. In another embodiment, the enclosure 202 includes apertures through which fit the lens barrels of the camera 106 and projector 108. The inside of the enclosure 202 is hermetically sealed from the outside environment. The enclosure 202 is portable and weather-resistant. The various components 204, 210, 104-A, 106, 108, 208 in the enclosure 202 are affixed to the inside of the enclosure 202 in order to allow the enclosure 202 to be transported without causing damage to the various components.

Figure 3:
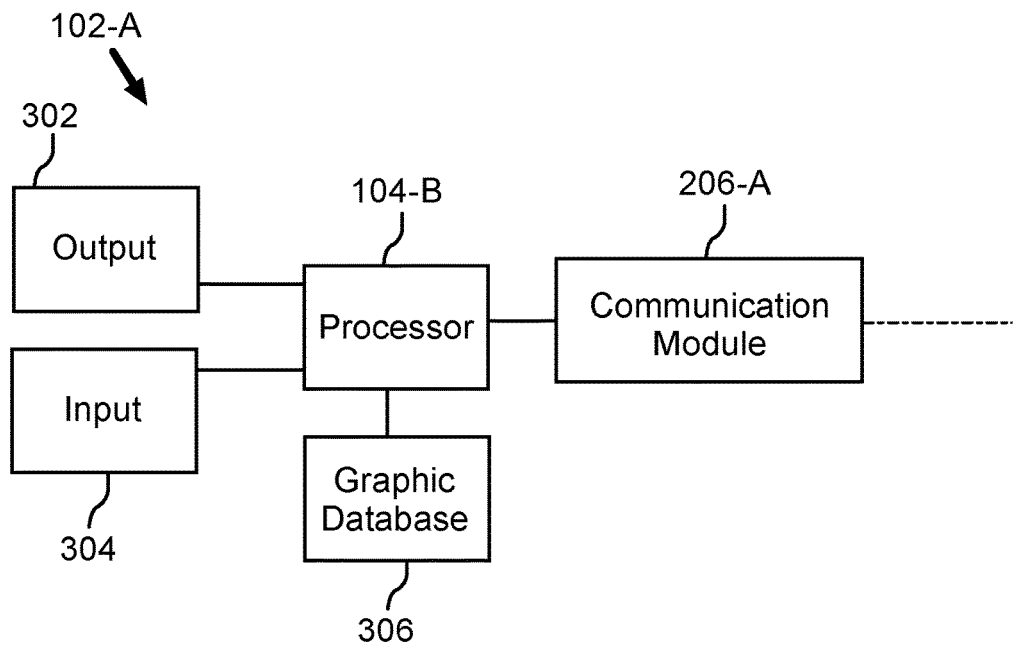
FIG. 3 is a simplified diagram of one embodiment of a workstation of an interactive projection system.

FIG. 3 illustrates an embodiment of the workstation 102-A. The workstation 102-A includes an input 304, an output 302, a processor 104-B, a graphic database 306, and the communication module 206-A. The processor 104-B is in communication with the output 302, which provides visual information to a user, such as through a graphical display. The output 302 displays information communicated from the processor 104-B. In one embodiment, the output 302 is a display panel affixed to the outside of the enclosure 202.

The processor 104-B is in communication with the input 304, which receives information from the user, such as through a keyboard, mouse, track pad, touch-screen, and/or other device. In one embodiment, the input 304 is a control panel affixed to the outside of an enclosure 202.

In the illustrated embodiment, the processor 104-B is in communication with a database 306 containing or storing graphic image files or data. In various embodiments, the database 306 is a part of the workstation 102-A as illustrated, a separate data storage device attached to the workstation 102-A, or a remote data storage device accessible by the workstation 102-A.

In one embodiment, the processor 104-B shares the programmed functions of the system 100 with the processor 104-A directly connected to the camera 106 and the projector 108. In another embodiment, the processor 104-B performs the programmed functions of the system 100 and directly communicates with the camera 106 and the projector 108.

Figure 4:
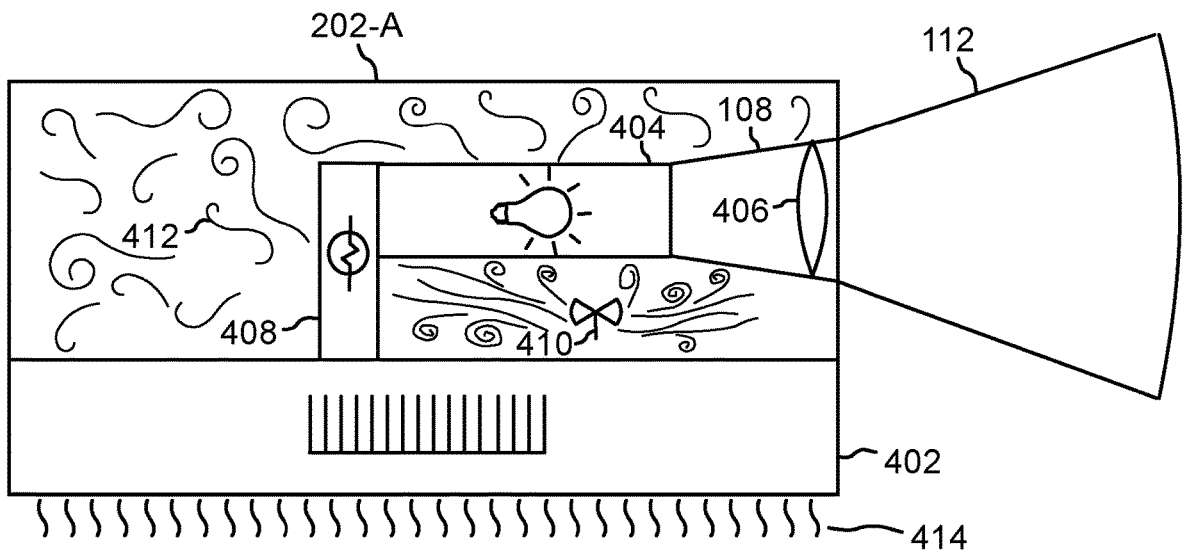
FIG. 4 is a representational illustration of one embodiment of an enclosure and projector of an interactive projection system.

FIG. 4 illustrates an embodiment of an enclosure 202-A coupled with a heat sink 402. The enclosure 202-A is weatherproof. The enclosure 202-A is capable of being used outdoors in inclement weather. The enclosure 202-A is portable. The inside of the enclosure 202-A is hermetically sealed from the outside environment.

The illustrated projector 108 is in the enclosure 202-A. The enclosure 202-A houses other components, such as the drives 208, 210, the processor 104-A, the communication module 204, and/or the camera 106. However, for the sake of simplicity, these components are not shown in FIG. 4.

The projector 108 includes a light source 404. The light source 404 transmits light through a lens 406. The position of the lens 406 is manipulated by a lever (not shown) with a gripping end that is external to the enclosure 202-A The light source 404 generates heat during use. In many cases the generated heat must be removed from the enclosure 202. In the illustrated embodiment, a heat exchanger 408 is adjacent to the light source 404. In one embodiment, the heat exchanger 408 is an internal heat tube. In another embodiment, the heat exchanger 408 is a member having high thermal conductivity.

The heat sink 402 includes a heat receiving portion and a heat transmitting portion. The heat receiving portion of the heat sink 408 is thermally coupled to the heat exchanger 408. In various embodiments, the heat sink 402 includes a block of metal that is the heat receiving portion and/or radiating fins that is the heat transmitting portion. In one embodiment, the heat sink 402 is thermally coupled to the floor of the enclosure 202-A. The heat sink 402 is flush with the floor of the enclosure 202-A. The floor of the enclosure 202-A is made of a material that conducts heat. In another embodiment, the enclosure 202-A has an open bottom and the top surface of the heat sink 402 is the floor of the enclosure 202-A.

In the illustrated embodiment, a fan 410 is in the enclosure 202-A. The fan 410 circulates air, thereby creating air currents 412 inside the enclosure 202-A. The fan 410, by way of the air currents 412, convectively transfers heat from the projector 108 to the enclosure 202-A, to the heat exchanger 408, and to the to the heat sink 402, directly if the heat sink 402 provides a portion of the enclosure 202-A. Heat received by the enclosure 202-A is transferred to the outside environment by radiation and convection. Heat received by the heat exchanger 408 is transferred to the heat sink 402, which transfers the heat to the outside environment by radiation and convection.

The projector 108 creates heat when in use. The projector's light source 404 creates heat. Other components in the enclosure 202-A also create heat when in use. The heat exchanger 408 carries heat away from the light source 404. The heat is transferred from the heat exchanger 408 to the heat sink 402 via conduction. The heat sink 402 bottom and side surfaces radiate the heat 414 to the outside. Thus, the inside of the container 202-A is able to stay hermetically sealed and be used in an outside environment for days at a time without overheating and damaging the components therein.

The air currents 412 generated by the fan 410 carry heat away from the light source 404. The air currents 412 carry the generated heat to the sides of the enclosure 202-A, including the heat sink 402. The heat 414 is then radiated out of the heat sink 402 and all sides of the enclosure 202-A. Thus, heat is dispersed away from the components in the enclosure 202-A.

Figure 5:
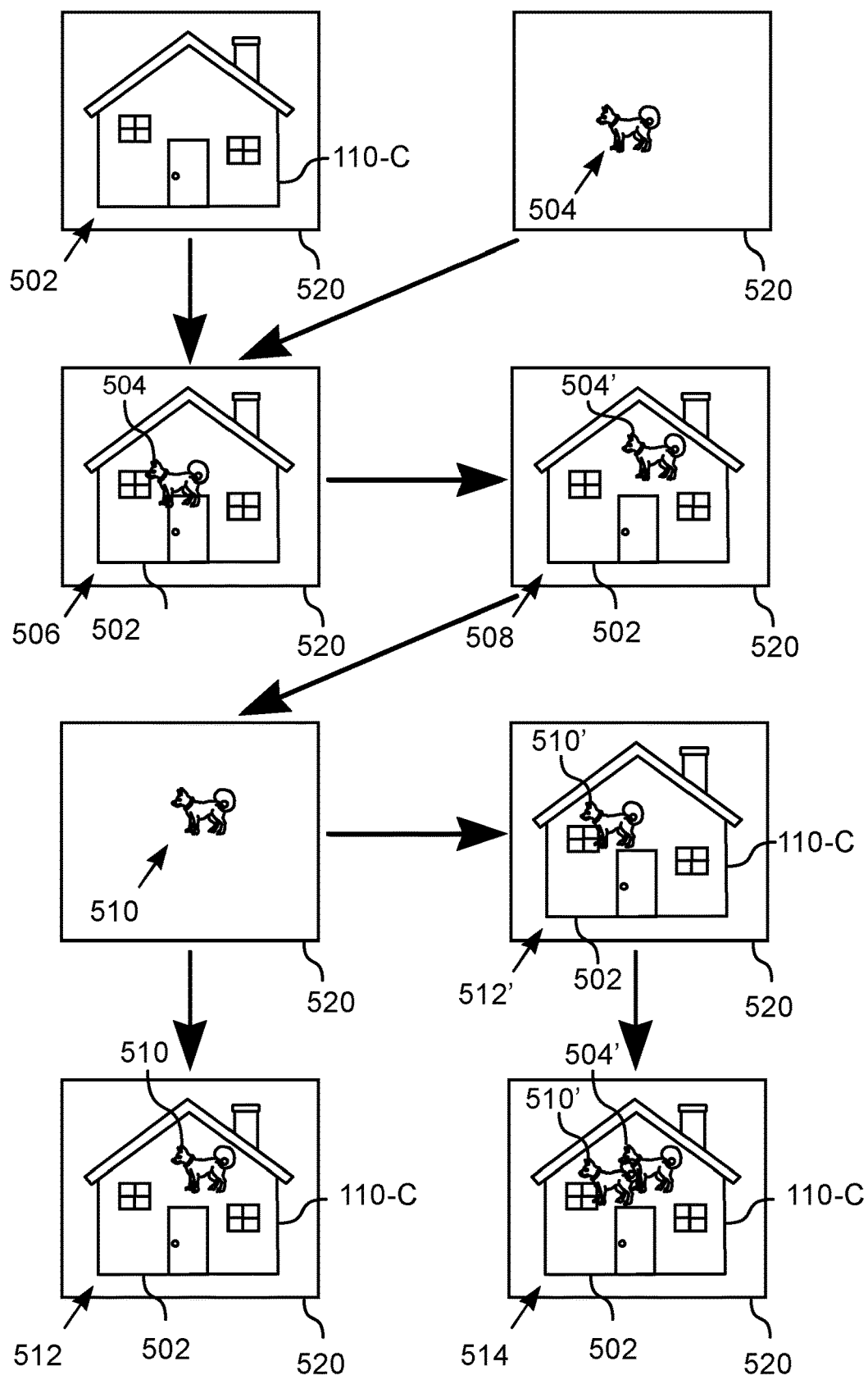
FIG. 5 is a representational illustration of one embodiment of the various images and graphics that the processor handles for the system.

FIG. 5 illustrates the various images and graphics that the processor 104 handles. The various images and graphics are illustrated in a frame 520, which represents a common frame of reference relative to the images and graphics. The frame 520, in various embodiments, is representative of the view area 114, the projection area 112, a window on the output 302 of the workstation 102, or another arbitrary frame of reference relative to all images and graphics.

The initial image 502 is acquired by the processor 104 from the camera 106. The initial image 502 shows the surface 110-C, including all the features that appear normally on the surface 110-C. The initial image 502 is bounded by the frame 520, which provides a frame of reference relative to the initial image 502.

The initial graphic 504 is a digital file that represents an image that the user desires to project on the surface. In various embodiments, the initial graphic 504 is stored in a storage device or created by the user as needed. The initial graphic 504 is bounded by the frame 520, which provides a frame of reference relative to the initial graphic 504.

The initial overlay image 506 is a combination of the initial image 502 and the initial graphic 504. The initial overlay image 506 is displayed on the output device 302 of the workstation 102. In this way the user is able to use the interactive workstation 102 to view the initial image 502 and the initial graphic 504. It is noted that the initial graphic 504 is positioned relative to the initial image 502 at a location that is not desirable to the user and the initial graphic 504 must be positioned, orientated, and/or scaled as selected by the user operating the workstation 102.

The manipulated overlay image 508 is a combination of the initial image 502 and a manipulated graphic 504', which is after the initial graphic 504 is manipulated by the user to a selected position, orientation, and/or scale. The user manipulates the position, orientation, and/or scaling of the initial graphic 504 as desired to obtain a selected position, orientation, and/or scaling of the manipulated graphic 504' relative to the initial image 502. The manipulated graphic 504' includes the initial graphic 504 with position, orientation, and/or scaling data such that the manipulated graphic 504' is projected by the projector 108 to a specified location on the surface 110-C. The manipulated graphic 504' becomes the projected graphic 510.

The projected graphic 510 is the manipulated graphic 504' after the manipulated graphic 504' is sent to the projector 108 and projected onto the surface 110-C. The projected graphic 510 is seen at a specified location on the surface 110-C.

The updated image 512, 512' is acquired by the processor 104 from the camera 106. The updated image 512, 512' shows the surface 110-C with the projected graphic 510 displayed on the surface 110-C. For the case where the camera 106 is aligned with the projector 108, the projected graphic 510 has the same position, orientation, and/or scale as the manipulated graphic 504', relative to the surface 110-C and the reference frame 520. For the case where the camera 106 is not aligned with the projector 108, the updated image 512' shows that the projected graphic 510' is not in the position, orientation, and/or scale as the manipulated graphic 504', relative to the surface 110-C and the reference frame 520.

The updated overlay image 514 is a combination of the updated image 512' and the manipulated graphic 504'. The updated overlay image 514 shows the projected graphic 510 in a different position than the manipulated graphic 504'. The misalignment is due to the camera 106 not being aligned with the projector 108. That is, a point in the view area 114 of the camera 106 does not coincide with a corresponding point in the projection view 112 of the projector 108. In such a case of misalignment, the projected graphic 510' must have its position, orientation, and/or scale adjusted such that the projected graphic 510' coincides with the manipulated graphic 504' as is shown for updated image 512.

Figure 8A:
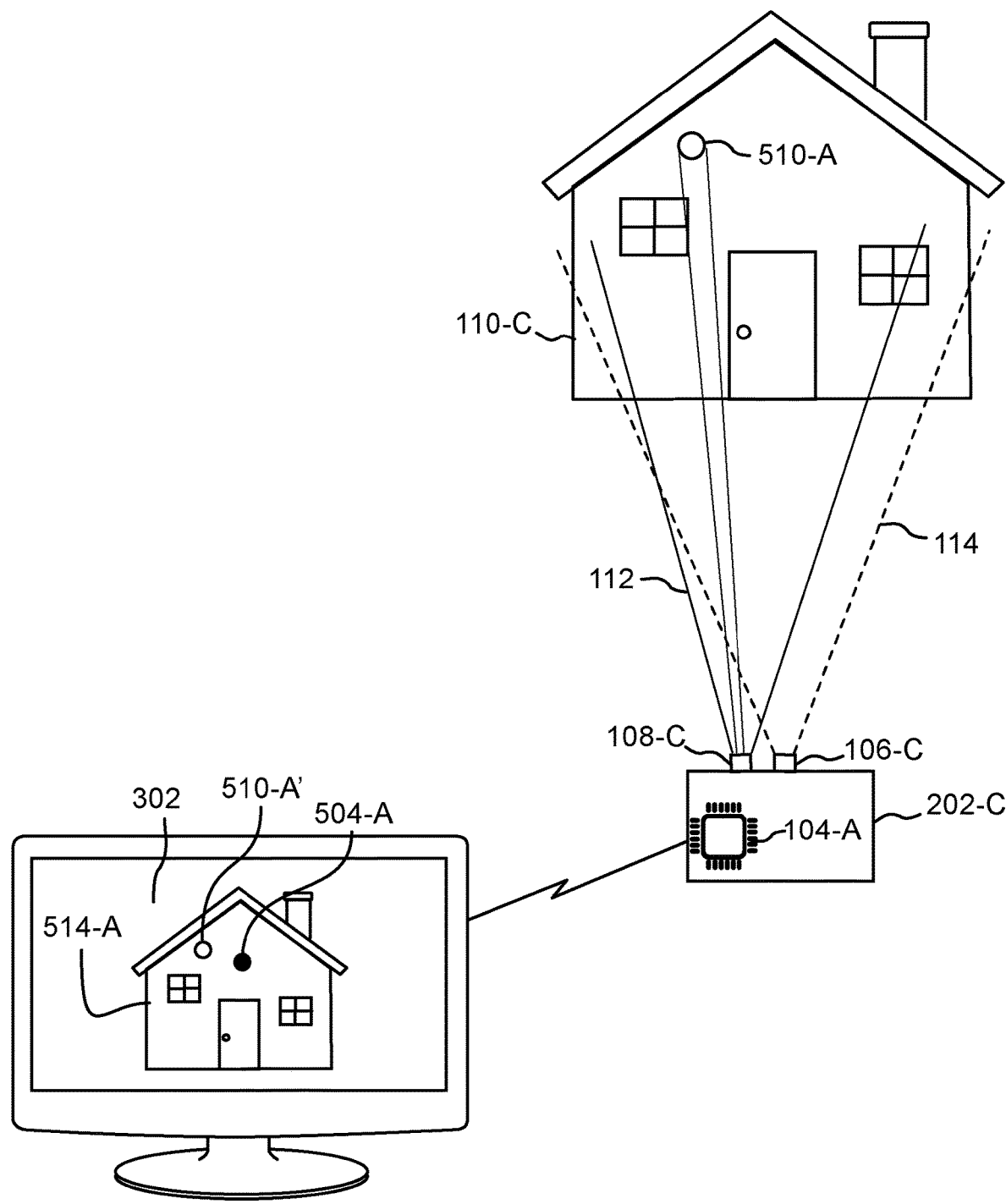
FIG. 8a is a representational illustration of one way to calibrate or align the projected graphic with the manipulated graphic in an embodiment of an interactive projection system and a projection surface.
Figure 8B:
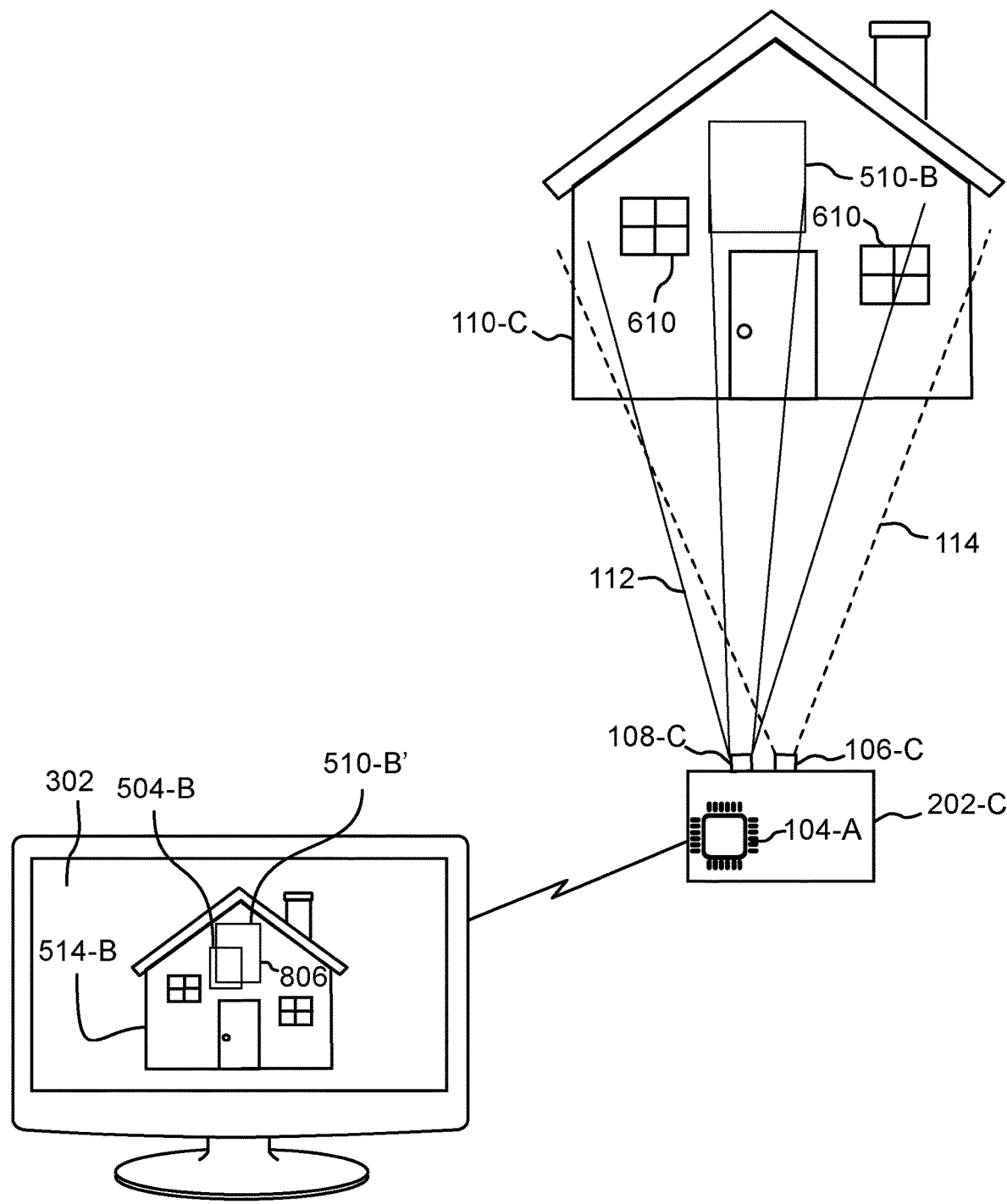
FIG. 8b is a representational illustration of another way to calibrate or align the projected graphic with the manipulated graphic in another embodiment of an interactive projection system and a projection surface.

The camera 106 and the projector 108 must be aligned for the view on the workstation 102 to match the camera's view area 114 of the surface 110 and the projected graphic 510 on that surface 110. In other words, points on the camera's view area 114 must be aligned to coincide with corresponding points on the projection area 112. In this way, when the initial graphic 514 is manipulated with respect to the initial view 502, the projected graphic 510 is positioned on the surface 110-C in the same position as the manipulated graphic 504' is seen on the manipulated overlay image 508. One way to ensure the alignment is through calibration. FIGS. 8a and 8b illustrate two ways of calibrating the system 100 to align the projected image 510-A, 510-B with the manipulated graphic 504-A, 504-B.

For example, FIG. 2 illustrates projector drive 208 that positions the projector 108 such that points on the projection area 112 coincide with the corresponding points on the view area 114 as seen on the workstation output 302. Correction of the position, orientation, and scaling selected for the manipulated graphic 504' is accomplished by the projector drive 208 adjusting the projector 108. In another embodiment, the processor 104 applies correction factors to the projected graphic 510 such that the projected graphic 510 appears on the surface 110 at the position, orientation, and scaling selected for the manipulated graphic 504' on the manipulated overlay image 508.

In one embodiment, the adjustment of the projected graphic 510' so that it corresponds with the selected position, orientation, and/or scale of the manipulated graphic 504' is accomplished by the user manipulating the projected graphic 510. In another embodiment, the processor 104 identifies points on the viewed graphic 510' and corresponding points on the manipulated graphic 504' and manipulates the projected graphic 510' so the points merge with the corresponding points.

In one embodiment, the projected graphic 510 is sent to the projector 108 after the manipulated graphic 504' is fully manipulated. In such an embodiment, the adjustment and alignment of the projected graphic 510 is an iterative process. In another embodiment, the projected graphic 510 is sent to the projector 108 concurrently with the manipulation of the manipulated graphic 504'. In such an embodiment, the updated image 512, 512' is acquired in real-time as the manipulated graphic 504' is being interactively manipulated.

Figure 6:
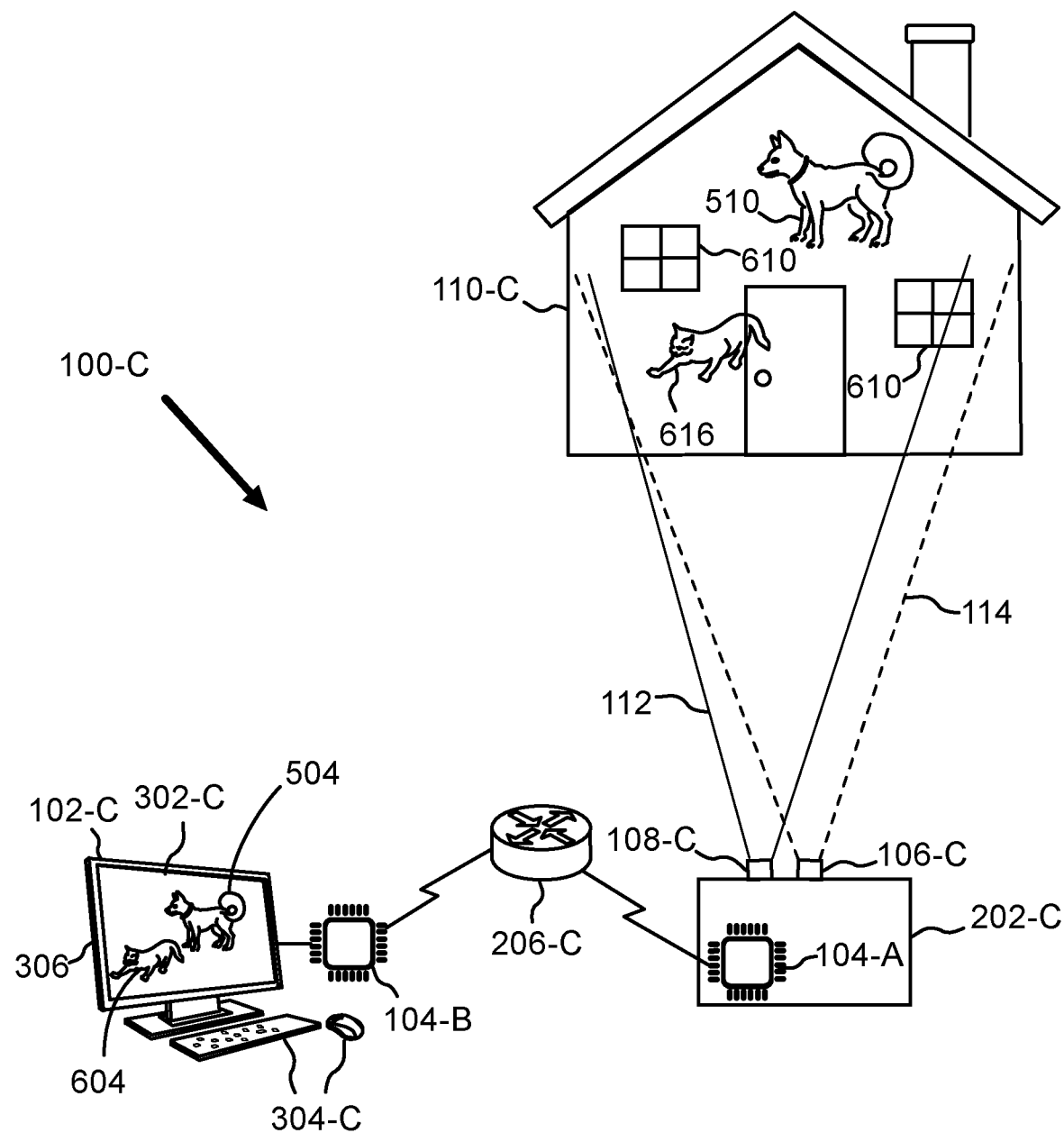
FIG. 6 is a representational illustration of another embodiment of an interactive projection system and another type of a projection surface.

FIG. 6 illustrates one embodiment of an interactive projection system 100-C. The illustrated work station 102-C is a desktop computer. The work station includes input 304-C in the form of a keyboard and mouse. The work station output 302-C is displayed on a computer screen. The work station processor 104-B is the computer's processor(s). The work station processor 104-C is programmed to execute functions for viewing graphics 504, 604 and projected graphics 510, 610 on the output 302-C and manipulating those images using the input 304-C.

Graphics 504, 604 are stored in the graphics database 306. The graphics database 306 is capable of storing videos. The user utilizes the input 304-C to retrieve the graphics 504, 604 and display the graphics 504, 604 on the output 302-C. In another embodiment, the workstation 102-C is configured to enable the user to create original graphics 504, 604. In another embodiment, the workstation 102-C is configured to enable the use to manipulate existing graphics 504, 604 to create derivative works.

The enclosure 202-C is physically separated from the workstation 102-C. The enclosure processor 104-A is in the enclosure 202-C. The workstation processor 104-B communicates with the enclosure processor 104-A via a communication module 206-C. The communication module 206-C is in the form of a WiFi router.

The enclosure 202-C is portable and weather-resistant. The enclosure 202-C is outside. In one embodiment, the enclosure 202-C is supported by a tripod. In another embodiment, the enclosure 202-C is supported by a post. In another embodiment, the enclosure 202-C is supported by feet. In another embodiment, the enclosure 202-C is permanently mounted.

The enclosure 202-C includes a projector 108-C and a camera 106-C. In another embodiment, the projector 108-C and camera 106-C are not in the same enclosure.

The projector 108-C is aligned such that the projection area 112 is on a surface 110-C. The surface 110-C is uneven. The surface 110-C contains areas 610 that are not optimal for image projection.

The surface 110-C is the side of a house. In another embodiment, the surface 110 is the outside of a building. In another embodiment, the surface 110 is a natural object, such as a rock or tree. In another embodiment, the surface 110-A is flat, even and not irregular, for example, a billboard or smooth inside wall.

The projector 108-C is capable of projecting graphics 510' onto the surface 110-C. The projected graphics 510, 616 are within the projection area 112 of the projector 108-C. The projected graphics 510, 616 are derived from their respective initial graphics 504, 604.

The surface 110-C includes sections 610, for example, windows, that are not optimal for the projected graphics 510, 616.

Figure 7:
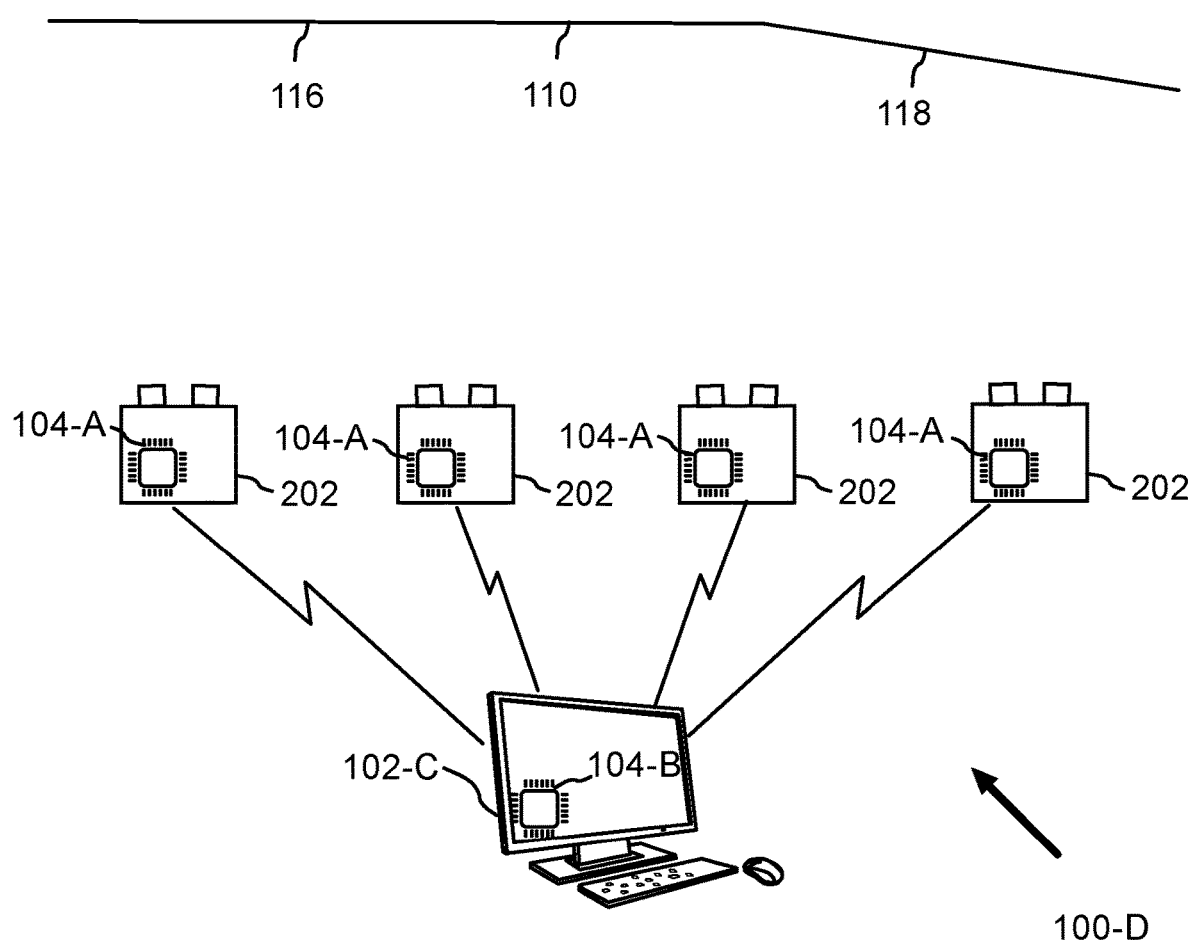
FIG. 7 is a representational illustration of yet another embodiment of an interactive projection system and the projection surface.

FIG. 7 illustrates a system 100-D with multiple enclosures 202, each of which includes its own respective processor 104-A. The workstation processor 104-B is in communication with all of the container processors 104-A. The workstation processor 104-B receives the input for the user to view at the workstation 102-C. Thus, the user may control the input 304-C to manipulate the images created by any and all of the projectors 202.

FIG. 8a illustrates the projector 108-C projecting onto the surface 110-C to calibrate the system 100 such that the projected graphic 510-A is aligned with the manipulated graphic 504-A that produced the projected graphic 510-A. The projection area 112 includes a projected graphic 510-A. The projected graphic 510-A originates from the projector 108-C. The illustrated projected graphic 510-A is a circle of light. In other embodiments, the projected graphic 510-A is another type of targeting shape, such as crosshairs. In one embodiment, the projected graphic 510-A is created by a laser, in order to avoid diffusing the projected graphic 510-A.

The output 302 displays an updated overlay image 514-A of the surface 110-C. The updated overlay image 514-A displayed at the output 302 is created by the camera 106-C acquiring an updated overlay image 514-A of the surface 110-C and communicating the updated overlay image 514-A to the output 302. A representation of the projected graphic 510-A is included in the updated overlay image 514-A displayed on the output 302.

The output 302 displays a manipulated graphic 504-A. The manipulated graphic 504-A is positioned on the updated overlay image 514-A by the user. The position of the manipulated graphic 504-A on the updated overlay image 514-A is communicated to the processor 104-A. The processor 104-A executes a function to instruct the projector 108-C to project the projected graphic 510-A onto the surface 110-C based upon the positioning of the manipulated graphic 504-A on the updated overlay image 514-A. If the projector is properly calibrated, the output 302 will display the representation of the projected graphic 510-A' as aligned superposed with the manipulated graphic 504-A.

If the representation of the projected graphic 510-A' is not aligned and superposed with the manipulated graphic 504-A, then the system 100 is not yet calibrated. Calibration of the system 100 is accomplished by manipulating the projected graphic 510-A until the representation of the projected graphic 510-A' is aligned with the manipulated graphic 504-A. In one embodiment, calibration is accomplished by shifting the X-Y orientation of the projected graphic 510-A using the projector drive 208, which shifts the projection area 112. In another embodiment, the processor 104-A applies correction factors to the projected graphic 510-A such that the projected graphic 510-A appears on the surface 110-C at the position selected for the manipulated graphic 504-A.

After the correction is applied, another updated overlay image 514-A is acquired, and the manipulated graphic 504-A and representation of the adjusted projected graphic 510-B' are compared again. In one embodiment, the processor 104-A is programmed to repeat one or more of the calibration methods and then compare the manipulated graphic 504-A and representation of the projected graphic 510-A' until the manipulated graphic 504-A and representation of the projected graphic 510-A' are aligned superposed with one another.

FIG. 8b illustrates the projector 108-C projecting onto the surface 110-C to calibrate the system 100 such that the projected graphic 510-B is aligned with the manipulated graphic 504-B that produced the projected graphic 510-B. The projection area 112 includes a projected graphic 510-B projected on to the surface 110-C. The projected graphic 510-B is a rectangle of light. In other embodiments, the projected graphic 510-B is another shape, for example, a triangle. In other embodiments, the projected graphic 510-B is a perimeter created by a laser.

The projected graphic 510-B avoids the areas 610 of the surface 110-C that are not optimal for projection. The projected graphic 510-B is capable of functioning as a preset border for a projected graphic 510 that is projected onto the surface 110-C.

The output 302 displays an updated overlay image 514-B of the surface 110-C. The updated overlay image 514-B displayed at the output 302 is created by the camera 106-C acquiring an updated overlay image 514-B of the surface 110-C and communicating the updated overlay image 514-B to the output 302. A representation projected graphic 510-B' of the projected graphic 510-B is included in the updated overlay image 514-B displayed on the output 302.

The output 302 displays manipulated graphic 504-B in the form of a rectangle. The manipulated graphic 504-B has been positioned, oriented, and scaled on the updated overlay image 514-B by the user. The manipulated graphic 504-B on the updated overlay image 514-B is communicated to the processor 104-A as a projected graphic 510-B. The processor 104-A executes a function to instruct the projector 108-C to project the projected graphic 510-B onto the surface 110-C based upon the positioning of the initial graphic 504-B on the updated overlay image 514-B. If the projector is properly aligned, the output 302 will display the projected graphic 510-B' as aligned with the initial graphic 504-B.

If the representation of the projected graphic 510-B' is not aligned and superposed with the manipulated graphic 504-B, then the system 100 is not yet calibrated. Calibration of the system 100 is accomplished by manipulating the projected graphic 510-B until the representation of the projected graphic 510-B' is aligned with the manipulated graphic 504-B. In one embodiment, the X-Y calibration of the projected graphic 510-B is accomplished by the projector drive 208, which shifts the location of the projection area 112. In one embodiment, the keystone effect of the projector is corrected by the projector drive 208 re-aligning one or more lens elements 406. In one embodiment, the orientation of the projected graphic 510-B is accomplished by causing the projector 108 to rotate the projected area 114. In one embodiment, calibration of the magnification of the projected graphic 510-B is accomplished by the projector drive 208 altering the position of one or more lens elements 406. In other embodiments, the projector 108 and/or drive 208 are controlled by the processor 104 to produce the desired and selected position, orientation, and scaling of the projected graphic 510-B.

In another embodiment, calibration of the system 100 is accomplished by the processor 104-A determining and applying correction factors to the projected graphic 510-B such that the projected graphic 510-B appears on the surface 110-C with the position, orientation, and scaling selected for the manipulated graphic 504-B.

After the alignment is applied, another updated overlay image 514-B is acquired, and the manipulated graphic 504-B and representation of the adjusted projected graphic 510-B' are compared again to determine if alignment is achieved. In one embodiment, the processor 104-A is programmed to repeat one or more of the calibration methods and then compare the manipulated graphic 504-B and representation of the projected graphic 510-B' until the manipulated graphic 504-B and representation of the projected graphic 510-B' are aligned superposed with one another. Thus, calibration is an iterative loop of moving the projected graphic 510-B and comparing its representation of the projected graphic 510-B' to the manipulated graphic 504-B.

Figure 9A:
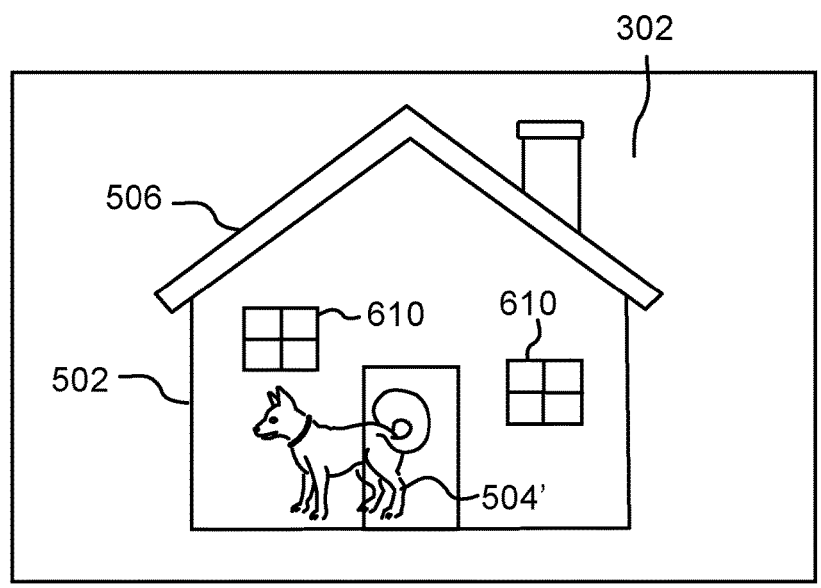
FIG. 9a is a representational illustration of an output layout in another embodiment of an interactive projection system and a projection surface.

FIG. 9a illustrates the output 302 where the initial image 502 has been communicated to the workstation 102. The output 302 also displays a manipulated graphic 504' superimposed on the initial image 502 of the surface 110-C. The manipulated graphic 504' is not part of the initial image 502. Rather, the manipulated graphic 504' is added separately by the user, using the input 304, after the initial image 502 has been created. In one embodiment, the manipulated graphic 504' is added to the initial image 502 by drawing the initial graphic 504 onto the image 702. In another embodiment, the manipulated graphic 504; is added to the image 702 by retrieving the initial graphic 504 from the graphic database 306. The processor 140-B is programmed to receive the combined initial image 502 and manipulated graphic 504' as an initial overlay image 506.

Figure 9B:
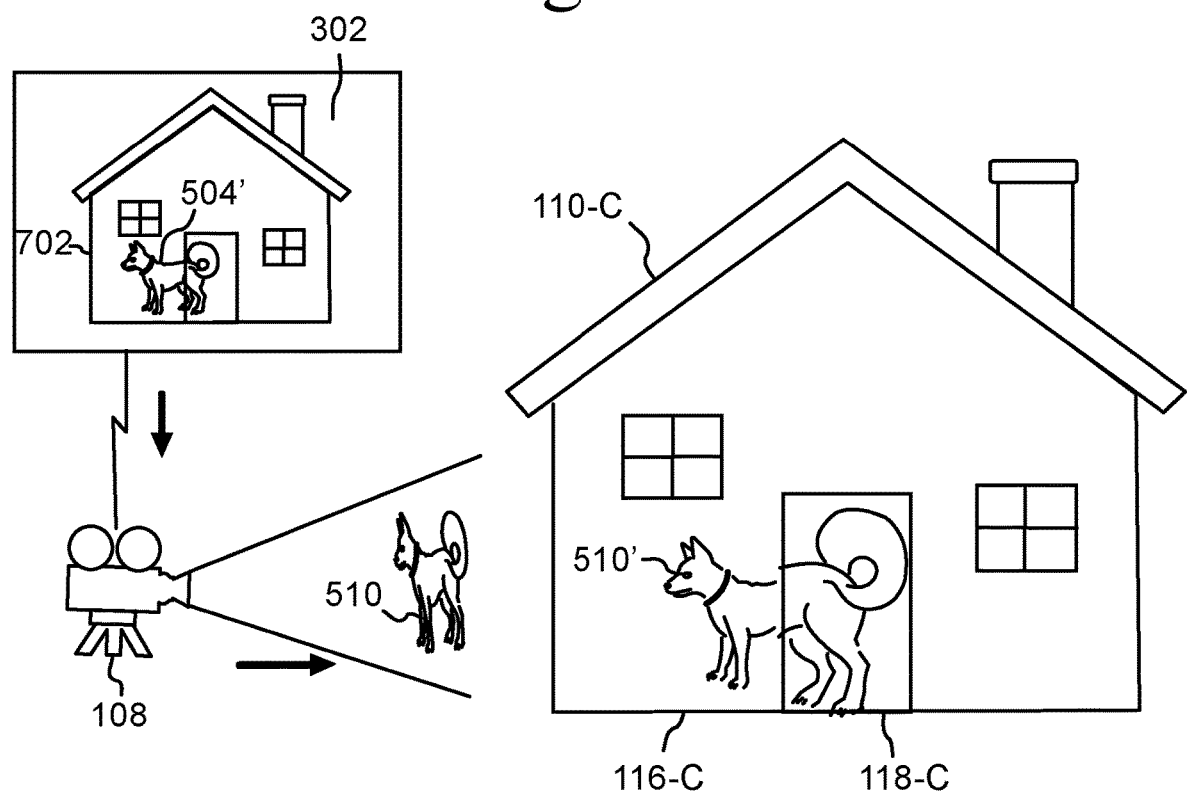
FIG. 9b is a representational illustration of an image projection in an embodiment of an interactive projection system and a projection surface.

FIG. 9b illustrates an initial projection of the manipulated graphic 504' in the output 302 being projected onto the surface 110-C. The manipulated graphic 504' is communicated through the processor 104 to the projector 108. The representation of the manipulated graphic 504' is projected as the projected image 510' on the surface 110-C.

The surface 110-C includes two portions 116-C, 118-C that are not co-planar. In the displayed embodiment, the first portion 116-C is the surface of an outside wall of a house. The second portion 118-C is the surface of a recessed door. The distance between the projector 108 and the first surface portion 116-C is less than the distance between the projector 108 and the second surface portion 118-C. The part of the image 510' projected onto the first portion 116-C is proportionally smaller than the part of the image 510' projected onto the second portion 118-C. Thus, the projected image 510' is distorted.

Figure 10:
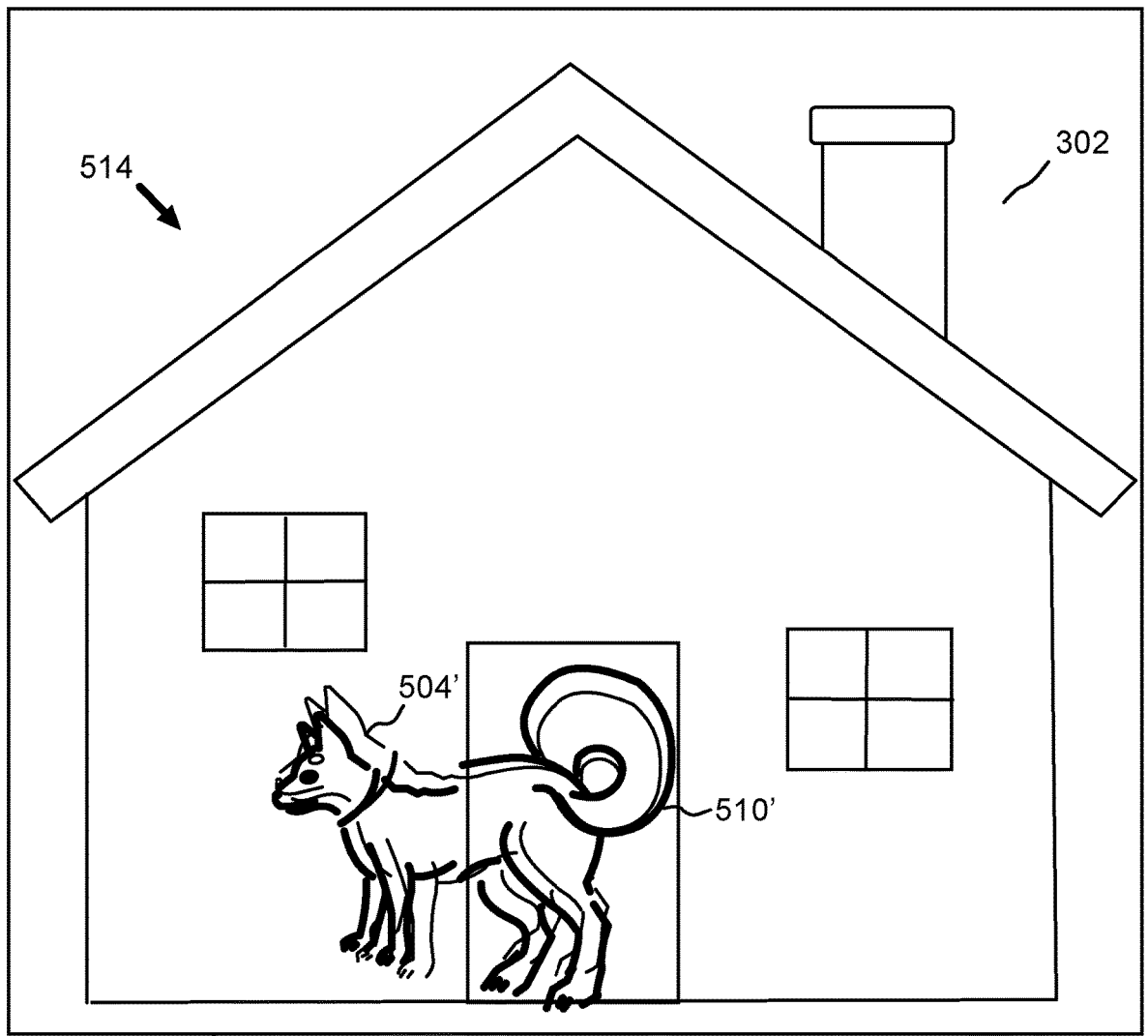
FIG. 10 is a representational illustration of a composite and surface in an embodiment of an interactive projection system and a projection surface.
Figure 10:
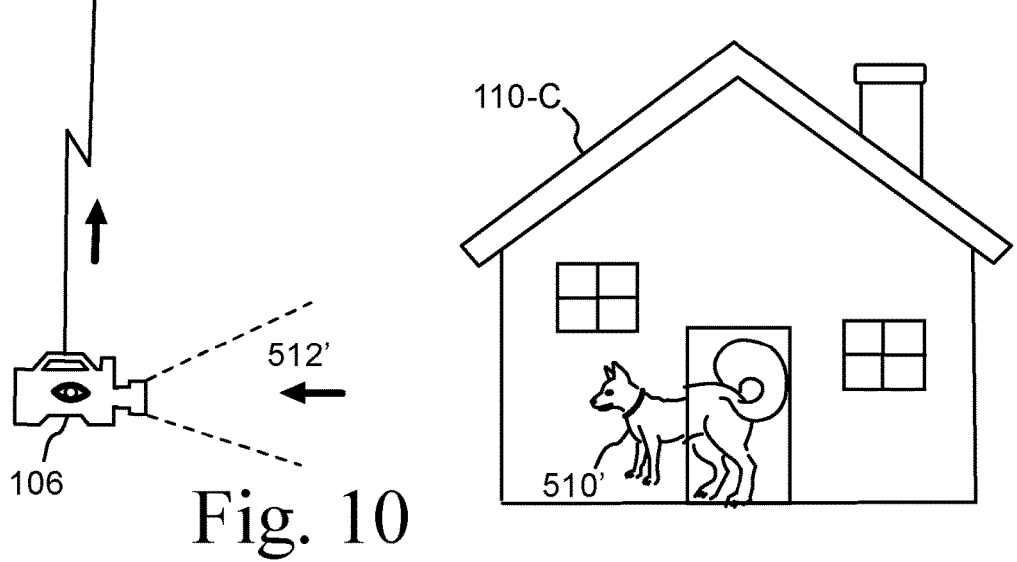

FIG. 10 illustrates the camera 106 acquiring an updated image 512' of the surface 110-C. The updated image 5122 is communicated to the output 302. The output 302 displays the updated image 512' in combination with the manipulated graphic 504' (i.e., as an updated overlay image 514.

The surface 110-C has not moved between the time of acquisition of the initial image 502 of the surface 110-C and the acquisition of the updated image 512' of the surface. Thus, the perimeters of the initial image 502 and updated image 512' are aligned and superposed.

The updated image 512' of the surface 110-C includes a representation of the projected graphic 510' projected on the surface 110-C. The representation of the projected graphic 510' does not align with the manipulated graphic 504' placed on the initial image 502.

Figure 11:
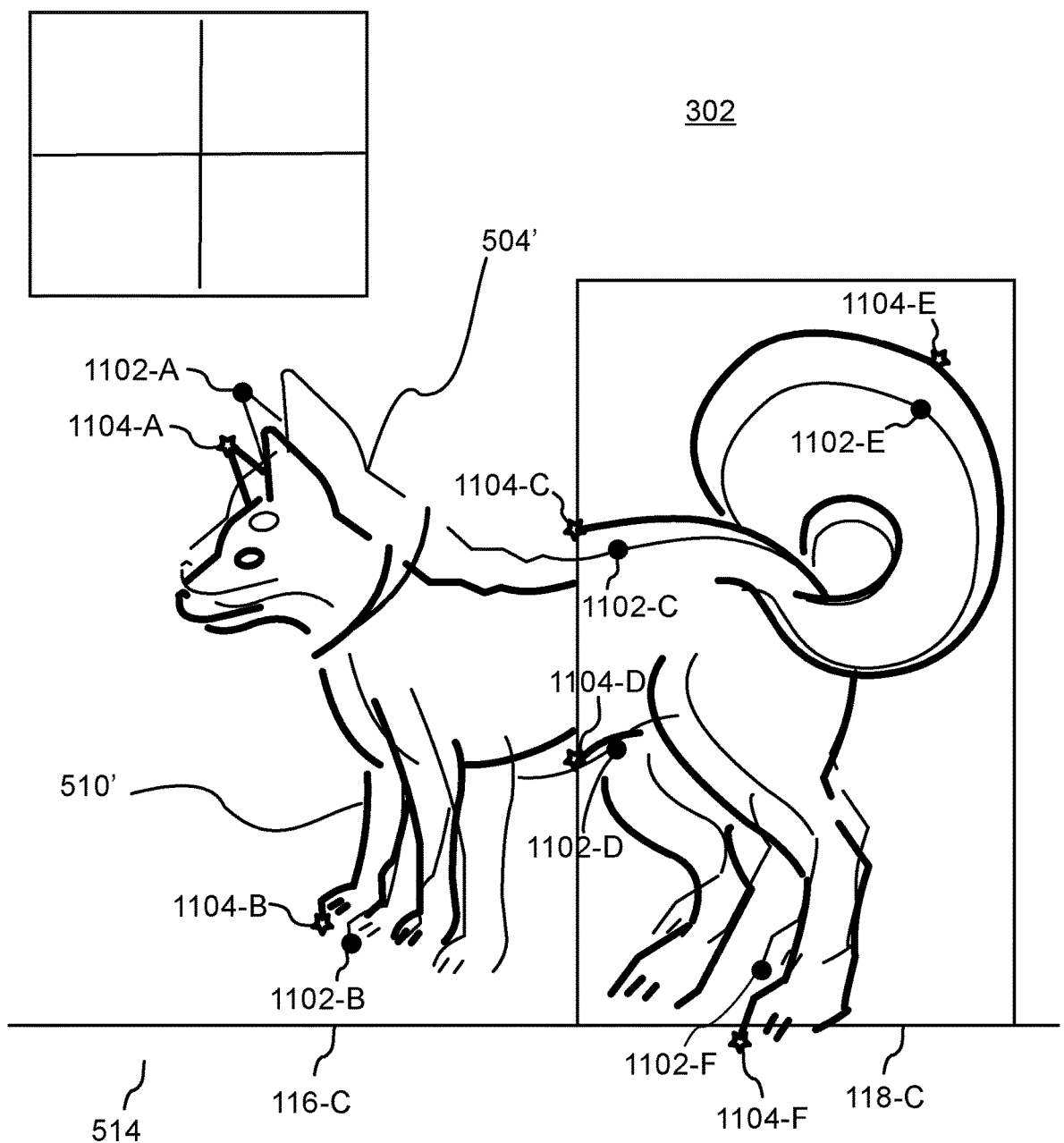
FIG. 11 is a representational illustration of a portion of the composite embodiment of FIG. 10.

FIG. 11 illustrates a close-up of a portion of the updated overlay image 514 displayed on the output 302. The manipulated graphic 504' placed on the initial image 502 is misaligned with the representation of the projected image 510'.

Points 1102-A, 1102-B, 1102-C, 1102-D, 1102-E, 1102-F are positioned on the manipulated graphic 504'. In one embodiment, the points 1102 are selected by the user using the input 304. In one embodiment, the points 1102 are selected by clicking at the points 1102 using a mouse. In one embodiment, the points 1102 are selected by pressing a finger at the points 1102 on a smart phone. In another embodiment, the points 1102 are automatically selected by the processor 104-B. The points 1102 are on the perimeter of the manipulated graphic 504'. In other embodiments, the points 1102 are not on the perimeter of the manipulated graphic 504'. There are two points 1102 selected, plus two additional points 1102 for every non-coplanar surface. In FIG. 11, there are two nonplanar portions 116-C, 118-C of the surface 110-C. Thus, six points 1102 are selected.

Corresponding points 1104-A, 1104-B, 1104-C, 1104-D, 1104-E, 1104-F are positioned in the composite 1006 on the representation of the projected graphic 510'. The corresponding points 1104 are selected by the user using the input 304. In one embodiment, the corresponding points 1104 are selected by clicking at the corresponding points 1104 using a mouse. In one embodiment, the points 1102 are selected by pressing a finger at the corresponding points 1104 on a smart phone. In another embodiment, the corresponding points 1104 are selected by the processor 104-A. The corresponding points 1104 are on the perimeter of the representation of the projected graphic 510'. In another embodiment, the corresponding points 1104 are not on the perimeter of the representation of the projected graphic 510'. 1004. Two of the corresponding points 1104-C, 1104-D are on the border between the two non-coplanar portions 116-C, 118-C.

Each point 1102 has a corresponding point 1104. Point 1102-A is at the same part of the outline on the graphic 502 as corresponding point 1104-A is on the outline of the image representation 1004. Point 1102-B is at the same part of the outline on the graphic 502 as corresponding point 1104-B is on the outline of the image representation 1004. Point 1102-C is at the same part of the outline on the graphic 502 as corresponding point 1104-C is on the outline of the image representation 1004. Point 1102-D is at the same part of the outline on the graphic 502 as corresponding point 1104-D is on the outline of the image representation 1004. Point 1102-E is at the same part of the outline on the graphic 502 as corresponding point 1104-E is on the outline of the image representation 1004. Point 1102-F is at the same part of the outline on the graphic 502 as corresponding point 1104-F is on the outline of the image representation 1004.

Figure 12:
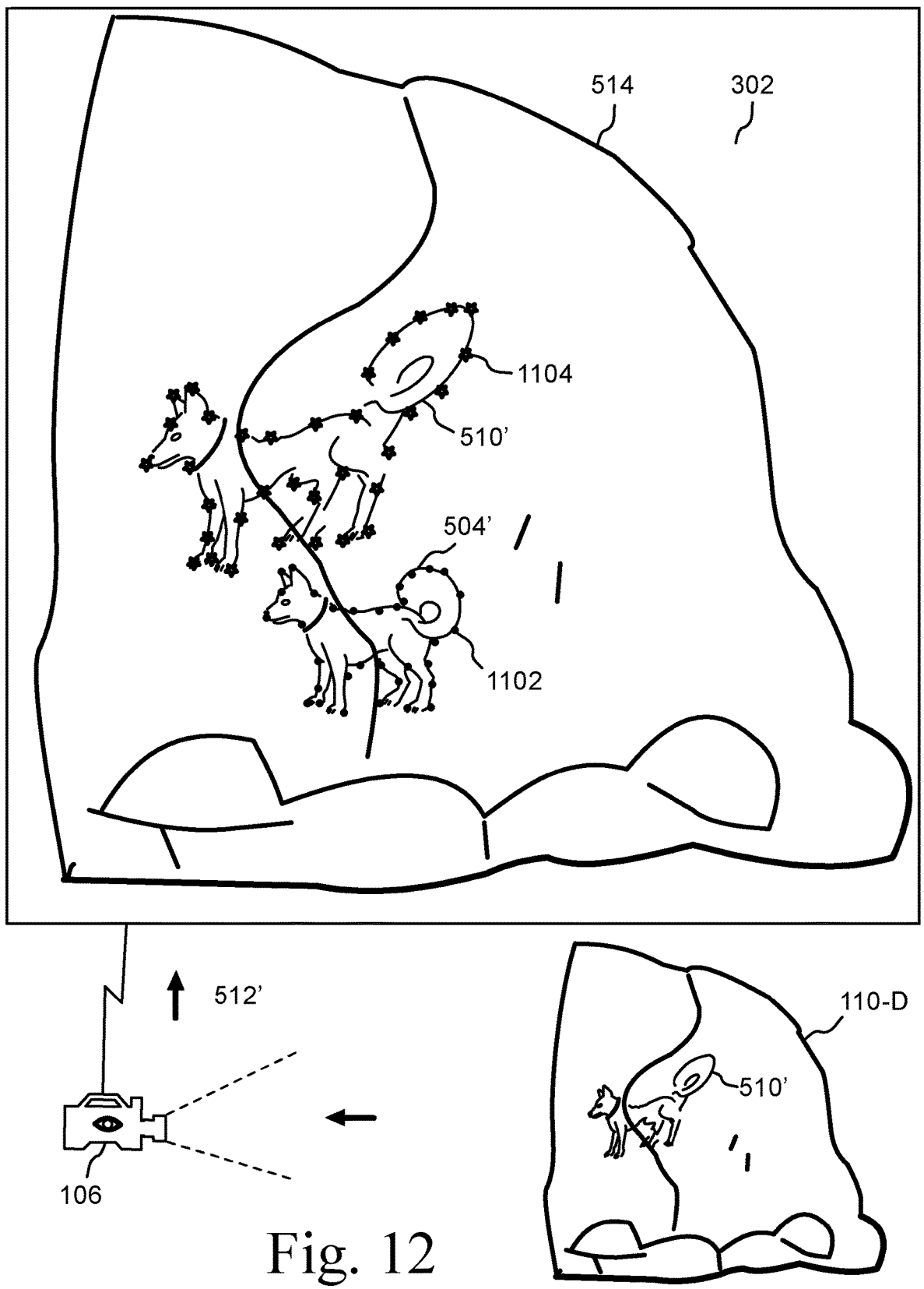
FIG. 12 is a representational diagram of a composite of an irregular surface and graphic displayed on an output.

FIG. 12 illustrates a surface 110-D with multiple portions that are not co-planar and not flat. In the displayed embodiment, the surface 110-D is a rock. The projected image 504' is distorted because the surface 110-D is not flat. The surface 110-D is a natural formation and has an unknown number of non-coplanar portions.

The updated image 512' includes a representation of the projected graphic 510'. The updated image 512' is sent to the output 302 and combined with the manipulated graphic 510' to create a updated overlay image 514.

Points 1102 are selected on the manipulated graphic 510'. The points 1102 are selected by the user using the input 304. In one embodiment, the points 1102 are selected by clicking at the points 1102 using a mouse. In one embodiment, the points 1102 are selected by pressing a finger at the points 1102 on a smart phone. In another embodiment, the points 1102 are automatically selected by the processor 104-B. The points 1102 are on the perimeter of the manipulated graphic 510'. In other embodiments, the points 1102 are not on the perimeter of the manipulated graphic 504'. The number of non-coplanar portions on the surface 110-D is unknown. Therefore, a multitude of points 1102 are selected on the perimeter of the manipulated graphic 510'. In the displayed embodiment, more than thirty points 1102 are selected on the manipulated graphic 504'. Corresponding points 1104 are selected on the representation of the projected graphic 510'.

Figure 13:
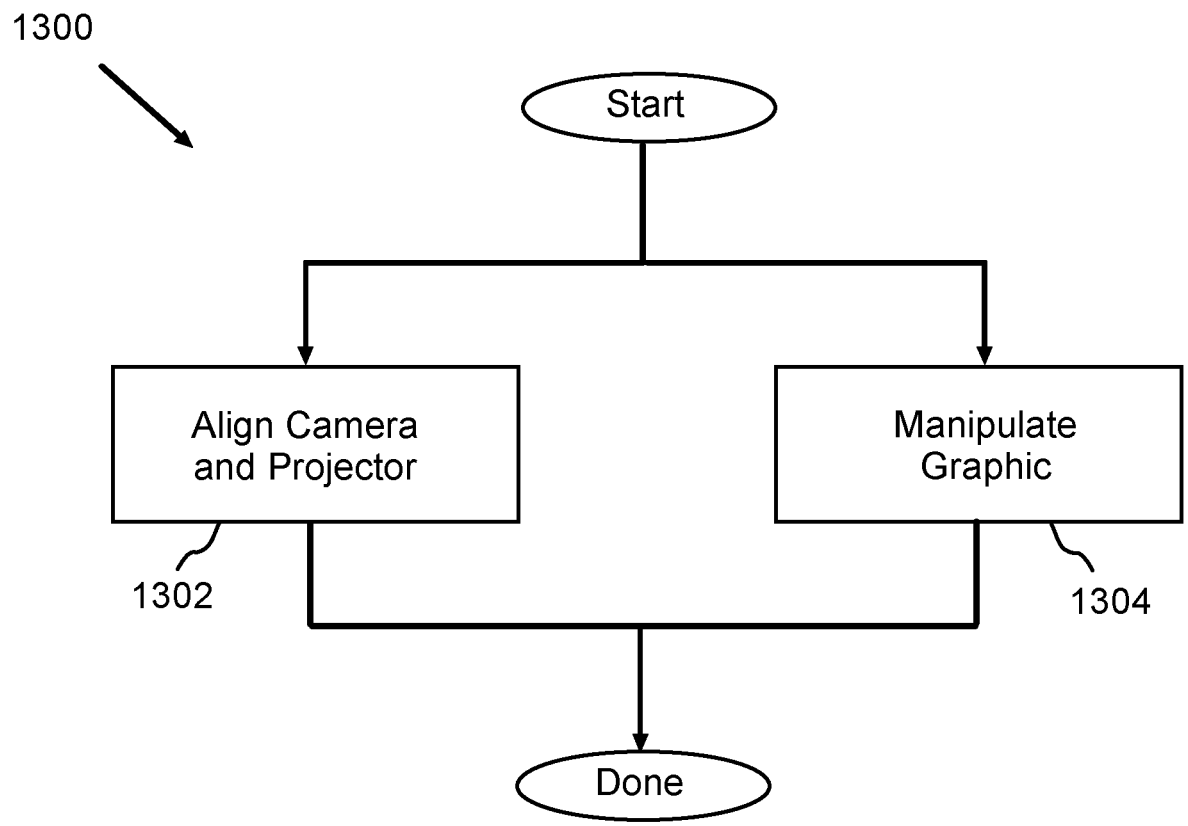
FIG. 13 is a flow chart of a method for properly projecting a desired image.

FIG. 13 illustrates a flow chart 1300 identifying steps for projecting a graphic 504 desired image 510. One step is ensuring that the camera 106 and projector 108 are aligned 1302 with respect to the surface 110. The other step is manipulating 1304 the graphic 504 to be properly represented as a projected image 510 on the surface 110. In one method, the camera 106 and projector 108 are aligned 1302 before the graphic 502 is manipulated. In another method, the camera 106 and projector 108 alignment 1302 is performed at the same time the graphic 502 is manipulated 1304.

Figure 14:
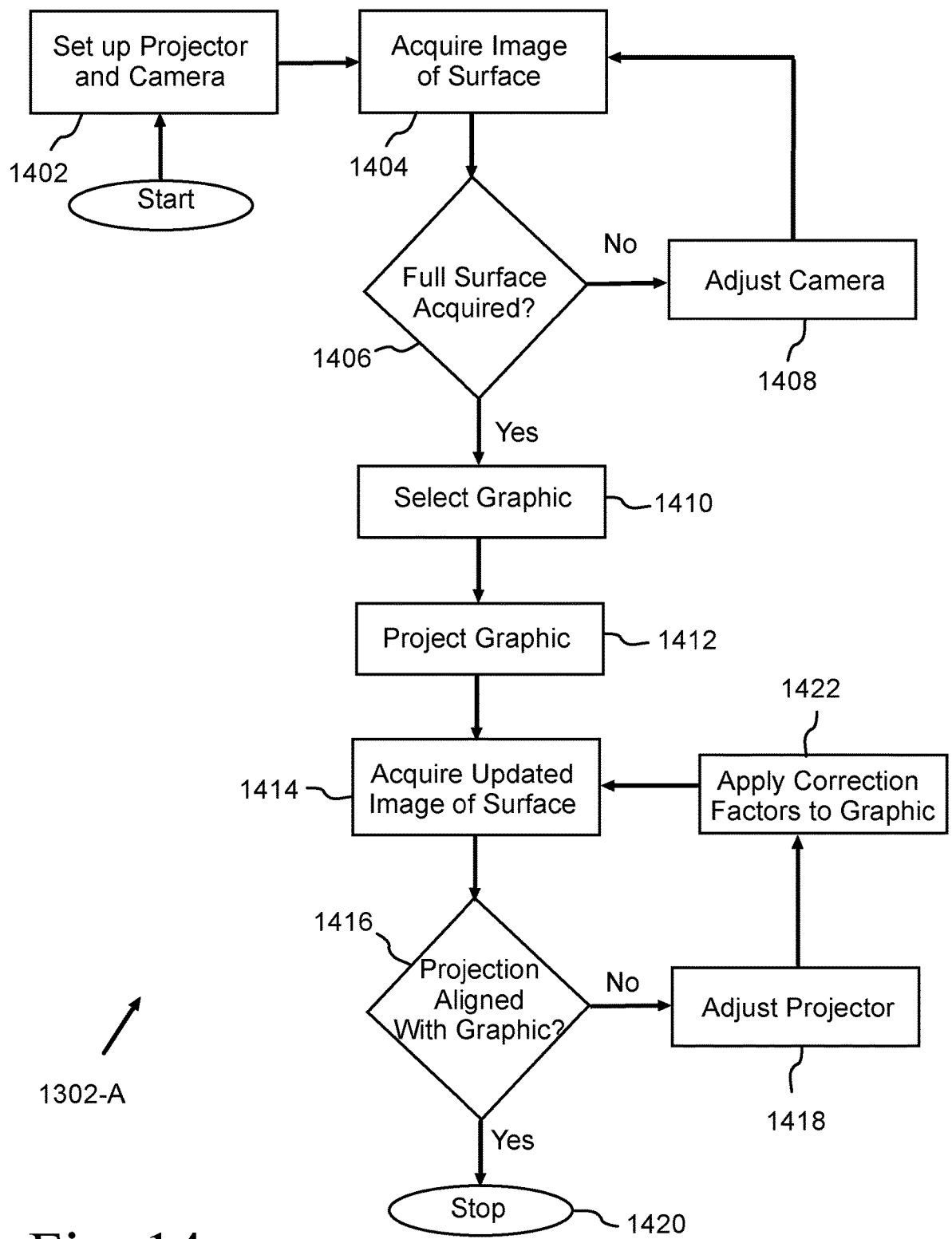
FIG. 14 is a flow chart of an embodiment of a method for aligning a camera and projector.

FIG. 14 illustrates one embodiment of a method 1302-A for aligning the camera 106-C and projector 108-C. The first step is to set up 1402 the projector 108-C and camera 106-C and direct them to point to the surface 110-C. In one method, the projector 108-C and camera 106-C share an enclosure 202-C and are aligned such that the camera's view area 114 significantly overlaps with the projector's projection area 112. The alignment of the camera 106-C and projector 108-C is such that the view area 114 completely encompasses the projector area 112 at the intended surface 110-C.

The camera 106 then acquires 1404 an image 502 of the surface 110-C. The image 502 is relayed to the output 302. The user views the image 502 of the surface 110-C at the output 302 to determine 1406 if the full surface has been acquired. If the camera 106 has not captured the entire surface 110-C that the user wants to view, the camera 106 is adjusted 1408. In one method, the user communicates to the drive 210 via the input 304 and processor 104-A to physically adjust the camera 106-C. In another method, the user aligns the enclosure 202-C to center the camera view area 114 onto the surface 110-C. In another method, the view angle of the camera 106-C is adjusted.

If the camera 106-C has successfully communicated the full desired surface 1406 to the output 302, the user selects 1410 an initial graphic 504-A on the image 502. The initial graphic 504-A is a single circle. In another embodiment, the initial graphic 504-A is displayed as crosshairs. In another method, the location of the initial graphic 504-A is determined by programming in the processor 104-B.

Once the initial graphic 504-A location on the image 502 has been selected, the initial graphic 504-A location is communicated to the projector 108-C though one or more processors 104. The projector 108 the projects 1412 the initial graphic 504-A on to the surface 110-C in the form of a projected graphic 510-A. The projected graphic 510-A is a circle of light. In another embodiment, the projected graphic 510-A is a lit up crosshair.

After the projector 108 has projected the projected graphic 510-A onto the surface 110-C, the camera 106 acquires 1414 an updated image of the surface 110-C. The updated image is communicated to the output 302 and replaces the original image on the output 302. The initial graphic 504-A remains, and the projected graphic 510-A projected on the surface 110-C is part of the updated image, shown in FIG. 8a as 510-A'. The location of the 501-A' seen in the output 302 is compared 1416 with the location of the initial graphic 504-A.

If the initial graphic 504-A and the acquired image of the projected graphic 510-A are aligned superposed at the output 302, then the projector 108 is properly aligned. If the initial graphic 504-A and projected graphic representation 510-A' are not aligned, then calibration is required. Calibration is accomplished by adjustment 1418 of the projector 108, applying correction factors 1422 to the graphic 504-A, or both. In one method, the projected graphic 510-A is realigned using the projector drive 208. The projector drive 208 rotates the projector 108, thereby shifting the X-Y axes of the projection area 112. In one embodiment, the user uses the input 304-C to communicate to the projector drive 208 via the processor 104-A to physically align the projector 108. In another embodiment, the processor 104-B is programmed with an algorithm to determine the relative positions of the target 504-A and marker 510-A and transmit appropriate instructions to the projector drive 208 to physically adjust 1418 the projector 108.

In another embodiment, calibration of the system 100 is accomplished by the processor 104-B applying correction factors to the projected graphic 510-A such that the projected graphic 510-A appears on the surface 110-C at the position selected for the initial graphic 504-A.

The camera 106 acquires 1414 an updated image of the surface 110-C, including the updated new location of the projected graphic 510-A. The updated overlay image 514-A, including an image 514-A of the new location of the representation of the projected graphic 510-A', is communicated to and displayed on the output 302. If the initial graphic 504-A and the acquired image of the projected graphic 510-A are aligned superposed at the output 302, then the projector 108 is properly aligned and the process ends. If the initial graphic 504-A and projected graphic 510-A' are not aligned, the adjustment steps 1414, 1416, 1418, and 1422 are repeated until the projector 108 is properly aligned.

Figure 15:
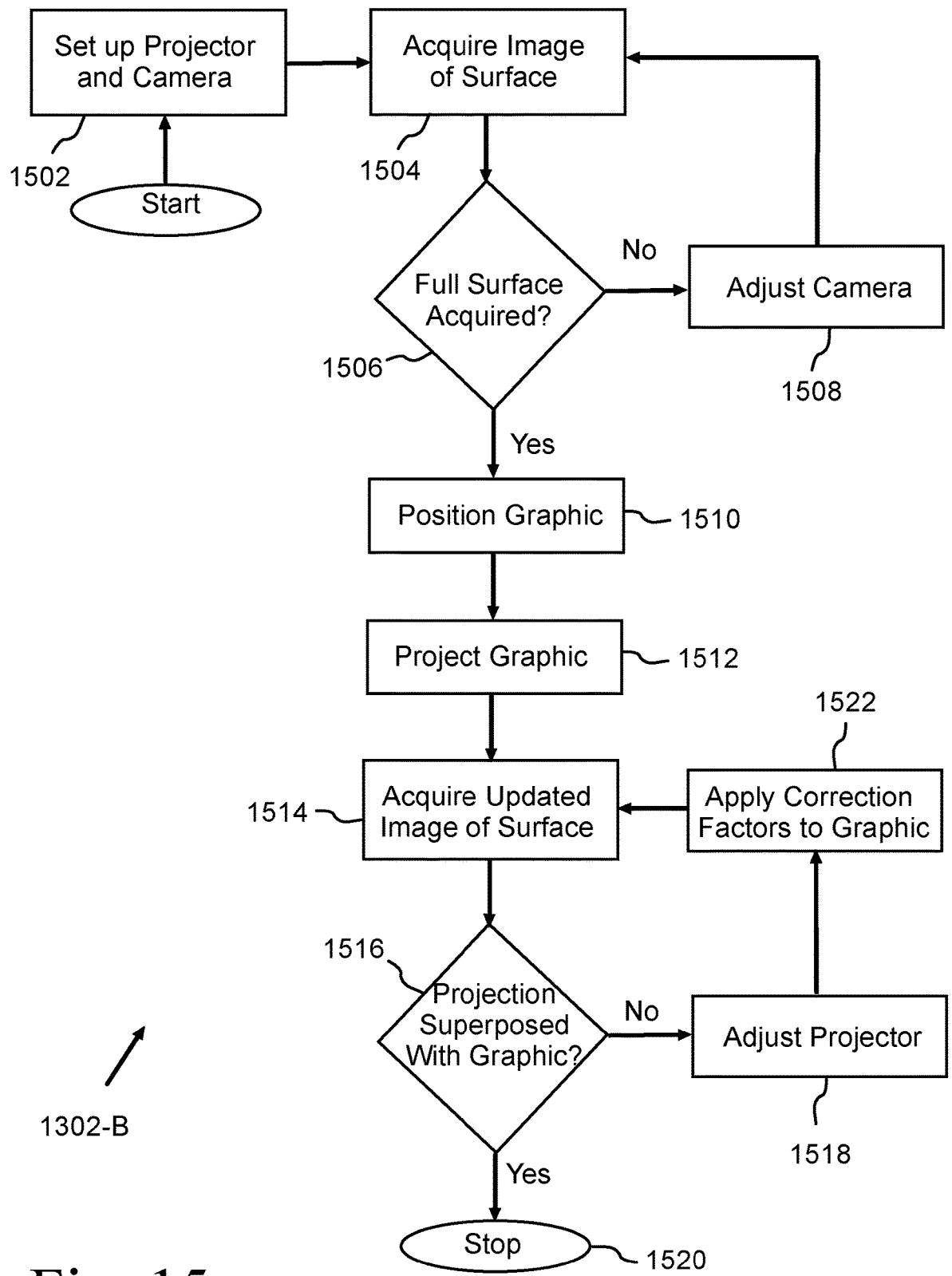
FIG. 15 is a flow chart of another embodiment of a method for aligning a camera and projector.

FIG. 15 illustrates another embodiment of a method 1302-B for aligning a camera 106 and projector 108. The steps 1502, 1504, 1506, and 1508 for setting up the projector 108 and camera 106 and adjusting the view area 114 of the camera 106 do not differ from the corresponding steps 1402, 1404, 1406, 1408 described in FIG. 14.

After the projector 108 and camera 106 are set up 1502 and the process 1504, 1506, 1508 is completed for acquiring the complete image of the surface area 110-C, the user positions a initial graphic 504-B on the initial image 502 at the output 302. In the displayed embodiment in FIG. 8b, the graphic 504-B is a rectangle. In another embodiment, the graphic 504-B is another closed geometric shape, for example, a trapezoid. In another embodiment, the graphic 504-B is a plurality of crosshairs or points arranged to collectively define the corners of a rectangle. In another embodiment, for example, when positioning and size is an issue but distortion is not, the graphic 504-B is two crosshairs or points that define opposing corners of a rectangle.

Once the graphic 504-B is positioned 1510 on the initial image 502, the graphic positioning is communicated to the projector, which projects 1512 the graphic 504-B as a projected graphic 510-B. In the displayed embodiment, the projected graphic 510-B appears as a solid rectangle of light. In another embodiment, the projected graphic 510-B is only the perimeter of a rectangle and from a laser. In another embodiment, the projected graphic 510-B appears as a plurality of crosshairs or points arranged to collectively define the corners of a rectangle. In another embodiment, the projected graphic 510-B appears as two crosshairs or points that define opposing corners of a rectangle.

Once the projected graphic 510-B has been projected on to the surface 110-C, the camera 106 acquires 1514 an updated image 512 of the surface 110-C. The updated image 512 of the surface 110-C now includes a representation of the projected graphic 510-B' projected onto the surface 110-C.

The initial graphic 504-B is compared 1516 to the representation of the projected graphic 510-B'. If the perimeter of the projected graphic representation 510-B' aligns with the perimeter of the initial graphic 504-B, then the alignment process is complete. However, if the projected graphic representation 510-B' does not align with the initial graphic 504-B (for example, as in FIG. 8b), calibration is required.

Calibration is accomplished by adjusting 1518 the projector 108, applies correction factors 1522 to the projected graphic 510-B, or both. In one embodiment, the user has the option of manually initiating the calibration process 1514, 1516, 1518, 1522. The system 100 does not proceed to step 1514 unless the user specifically activates the calibration process 1514, for example, by pressing a button on the enclosure 202. In another embodiment, the calibration process 1514, 1516, 1518, 1522 begins automatically after the graphic image 510 is projected 1512.

Projector adjustment 1518 includes repositioning the e 510-B, adjusting the size and shape of the frame 510-B, or both. Repositioning the frame 510-B is accomplished through various methods. In one method, the projected graphic 510-A is realigned using the projector drive 208. The projector drive 208 rotates the projector 108, thereby shifting the X-Y axes of the projection area 112. In one method, projector adjustment 1518 is performed by the user physically moving the projector 108 to change the location of the projected graphic 1512. In another embodiment, projector adjustment 1518 is remotely performed by the user communicating via the input 304 to the projector motor 208 to physically rotate the projector 108. In another embodiment, projector adjustment 1518 is performed by the processor 104-B performing an algorithm to analyze the difference in location between the graphic 504-B and the frame representation 510-B', determining the appropriate adjustment for the projector 108, and instructing the projector drive 208 to physically rotate the projector 108.

Adjusting the size and shape of the frame 510-B is accomplished through various methods. In one embodiment, projector adjustment 1518 is performed by the user physically moving the projector 108 further from or closer to the surface 110-C, thereby changing the size of the frame 510-B. In another embodiment, projector adjustment 1518 is performed by the projector drive 208. The projector drive 208 repositions the lens elements 406 to alter the size of the projected graphic 510-B, or to correct for any keystone distortion. In one embodiment, projector adjustment 1518 is performed by the processor 104-B performing an algorithm to analyze the difference in size and shape between the graphic 504-B and the frame representation 510-B', and compensating for the difference in new information to the projector 108 to display the frame 510-B. In some instances where the decorative image 510 of a graphic design 504 is to be displayed wholly within the surface area of the adjusted frame 510-B, this projector adjustment 1518 embodiment performs both steps 1300 of aligning the projector 1302 and manipulating in advance the decorative graphic 1304.

As an optional or additional step to adjustment of the projector 1518, calibration of the system 100 is accomplished by the processor 104-B applying correction factors to the projected graphic 510-B such that the projected graphic 510-B appears on the surface 110-C at the position selected for the initial graphic 504-B.

After the calibration steps 1518, 1522 are performed, the camera 106 acquires an updated image of the surface 110-C. The graphic 504-B and the updated representation 510-B' of the projected graphic 510-B are again compared 1516. If the perimeters of the graphic 504-B and projected graphic representation 510-B' match, the alignment process 1302-B is complete 1520. Otherwise, the projector adjustment process repeats 1514, 1516, 1518 until the projected graphic 510-B is properly projected on the surface 110-C.

Figure 16:
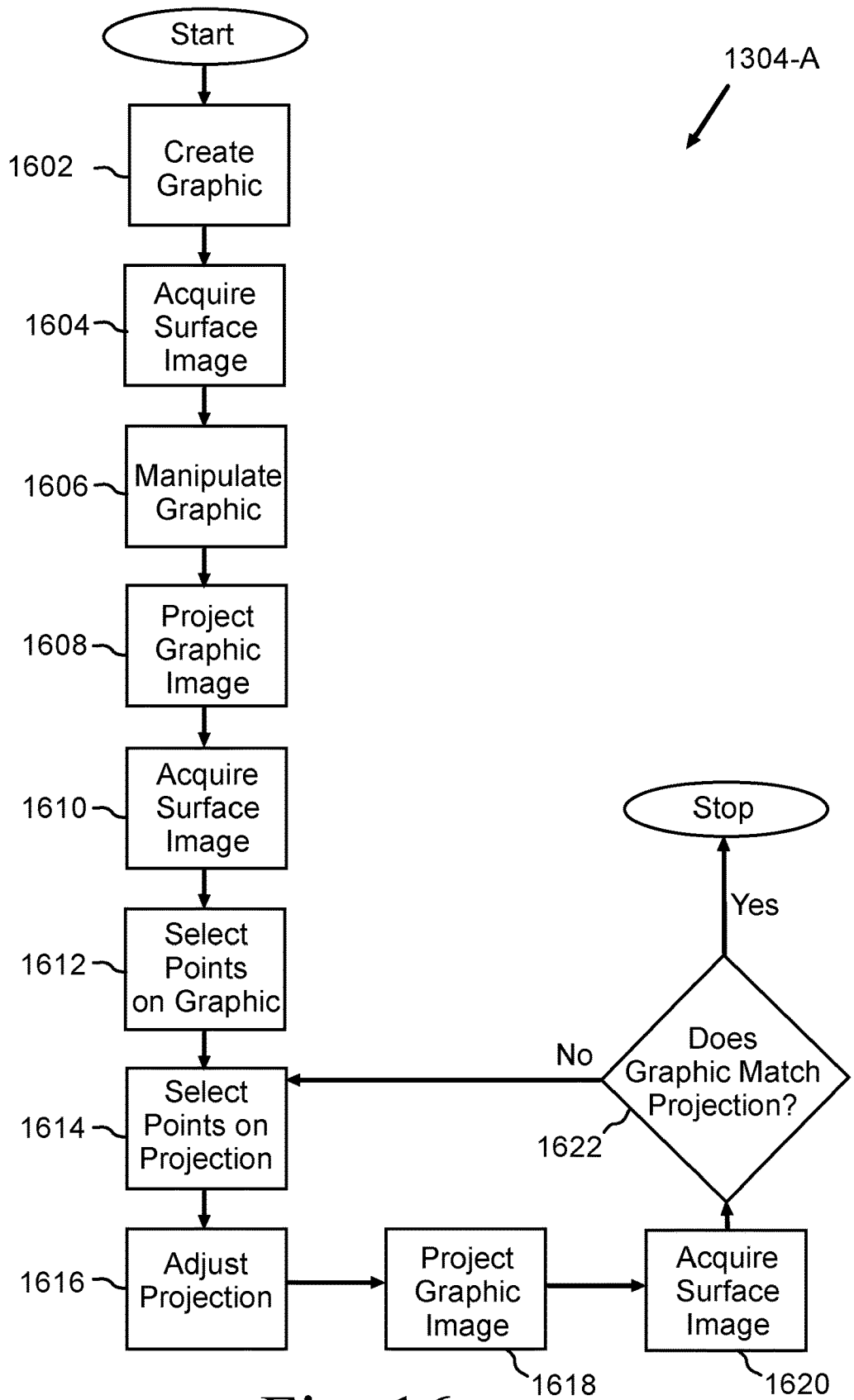
FIG. 16 is a flow chart of an embodiment of a method for manipulating a projected image.

FIG. 16 illustrates one embodiment 1304-A of a method for manipulating the graphic 504 to make the desired projected image 510 on the surface 110-C. The graphic 504 is created 1602 such that it is viewable on the output 302. In one method embodiment, the user uses the input 304 to retrieve the graphic 504 from the graphic database 306. In another method embodiment, the user creates the graphic 504 with the input 304.

The processor 104 acquires 1604 an image 502 of the surface 110-C. The image 502 is communicated to the output 302.

The user uses the input 304 to manipulate 1606 the graphic 504 to position, align, size, and/or distort the graphic 504 to the desired location on the surface image 502. FIG. 9a illustrates one embodiment of a manipulated graphic 504' placed on a surface image 502. The manipulated graphic 504; is placed to avoid areas 610 where projected images would not display properly. The combined manipulated graphic 504' and surface image 502 is the manipulated overlay image 508.

The manipulated graphic 504' is communicated to the projector 108, which projects 1608 the manipulated graphic 504' onto the surface 110-C in the form of the projected image 510. One embodiment of a manipulated graphic 504' being projected onto the surface 110-C is illustrated in FIG. 9b.

In one embodiment, the user has the option of manually initiating the correction process 1610-1622. The system 100 does not proceed to step 1610 unless the user specifically activates the correction process 1610-1622, for example, by pressing a button on the enclosure 202 or at the workstation 102. In another embodiment, the correction process 1610-1622 begins automatically after the graphic image 510 is projected 1608.

The camera 106 acquires 1610 an updated image 512 of the surface 110-C. The updated image 512 of the surface 110-C now includes a representation of the projected image 510.

When the updated image 512' is acquired 1610 and communicated to the output 302, the output 302 displays both the updated image 512' and the manipulated graphic 504' as an updated overlay image 514.

Points are selected 1612 on the manipulated graphic 504'. In one embodiment, the points 1102 are at the perimeter of the manipulated graphic 504'. In one embodiment, the number of points 1102 selected is equal to 2 plus 2n, where n is the total number of non-coplanar portions 116-C, 118-C of the surface 110-C onto which the projected image 510' appears. FIG. 11 illustrates an embodiment where the projected image 510' appears on two non-coplanar surfaces 116-C, 118-C, and therefore six points 1102-A, 1102-B, 1102-C, 1102-D, 1102-E, 1102-F are selected. In one embodiment, the points 1102 are selected manually by the user. In another embodiment, the processor 104-B is programmed to select points 1102.

Corresponding points are selected 1614 on the representation of the projected graphic 510'. The corresponding points 1104 on the representation of the projected graphic 510' are in the same relative locations as the points 1102 on the manipulated graphic 504'. Where the projection is on two non-coplanar portions 116-C, 118-C, two corresponding points 1104-C, 1104-D are positioned on the representation of the projected graphic 510; where the two non-coplanar portions 116-C, 118-C meet. In one embodiment, the points 1104 are selected manually by the user. In another embodiment, the processor 104-B is programmed to select points 1104.

The projected image 510' is adjusted 1616 in based upon the displacement between the points 1102 and corresponding points 1104. In one embodiment, the processor 104-B is programmed to compare the displacement between the points 1102 and corresponding points 1104. The processor 104-B determines the necessary adjustment of the projected image 510' is based upon the displacement between each point 1102 and its corresponding point 1104. After the projection adjustment requirement is determined, the projector 108 is instructed to project the graphic 502 as the adjusted projected image 510'.

The processor 104 acquires 1620 an updated image of the surface 110-C. The projected image 510; in the updated image is compared 1622 to the manipulated graphic 504'. If the manipulated graphic 504' and projected image 510' are identical in relative shape, size, and location, the process is complete. In one embodiment, the updated overlay image 514 is recreated, and the manipulated graphic 504' and projected image 510' are completely superposed if the projected image 510 is projected accurately. In another embodiment, the initial manipulated overlay image 506 and updated overlay image 514 are compared side by side and analyzed by the processor 104-B.

If the projected image 510' does not yet match the manipulated graphic 504', new corresponding points 1104 are selected 1614 on the updated representation of the projected image 504', and the adjustment and confirmation process 1614, 1616, 1618, 1620, 1622 is repeated until a match is achieved.

Figure 17:
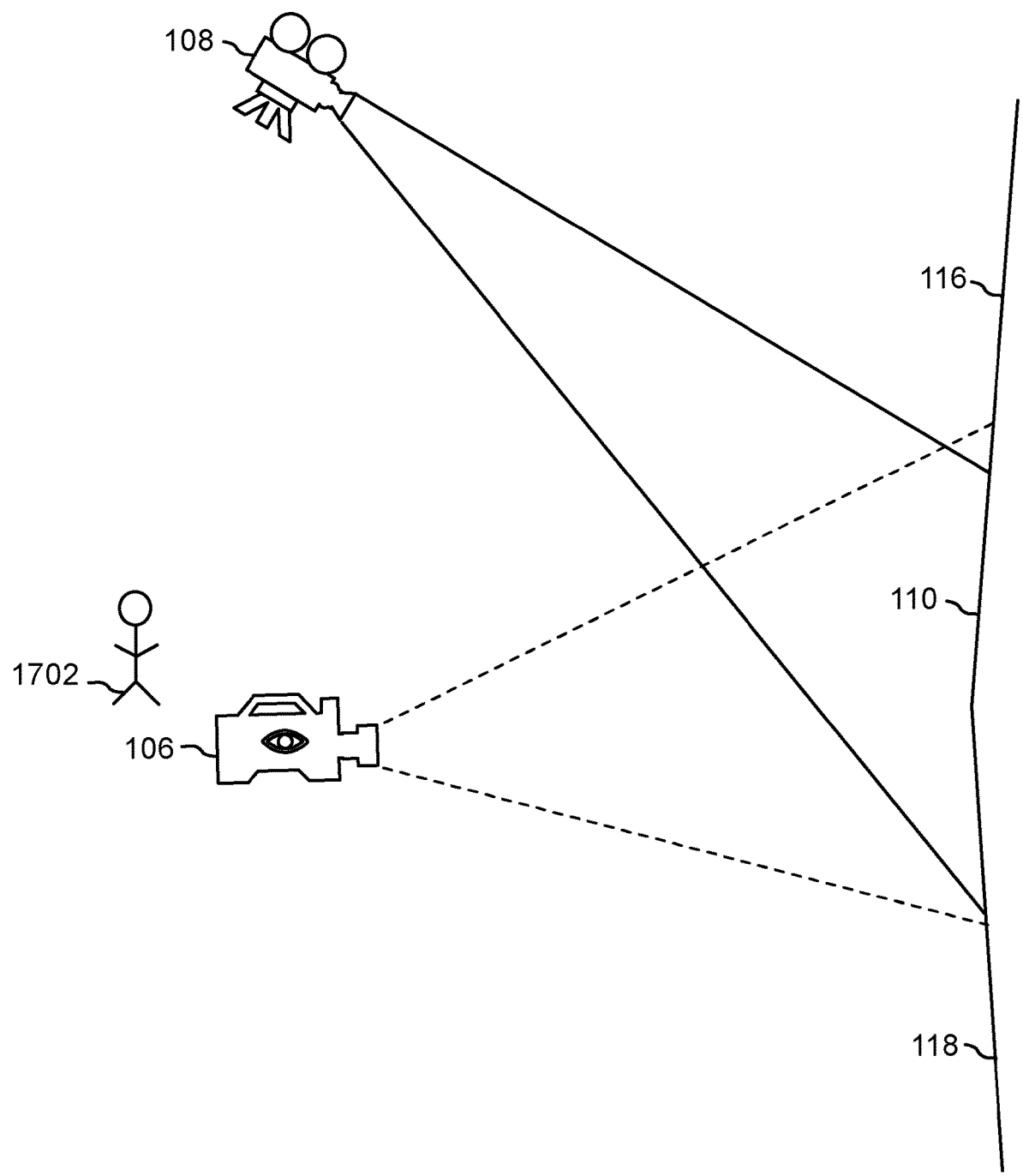
FIG. 17 is a representational illustration of placement of a camera and projector in still another embodiment of an interactive projection system and a projection surface.

FIG. 17 illustrates a camera 106 and projector 108 that are not proximate to one another. In some instances, the projector 108 is projecting on a surface 110 at an angle that will be different from the viewing angle of the typical viewer 1702. In the displayed embodiment, the projector 108 is projecting on the surface 110 at an acute angle, while the typical viewer 1702 of the projected image 506 will view the image 506 at a position substantially perpendicular to the surface 110. In such an instance, the viewing position and angle of the camera 106 should match as closely as possible the viewing position of the typical viewer 1702.

The system includes various functions. The function of creating the graphic 504 is implemented, in one embodiment, by the user at the workstation 102. The function of creating the graphic 504 is implemented, in another embodiment, by retrieving premade graphics 402, including text, animation, and video, in the database of the workstation 102.

The function of adjusting the projected image 116 is implemented, in one embodiment, by the processor 104 transmitting instructions to the projector 110 via the router 106.

The function of selecting points 1102 on the manipulated graphic 504' and selecting corresponding points 1104 on the projected image 510' is implemented, in one embodiment, by the user at the workstation 102. The function of selecting points 1102 on the manipulated graphic 504' and selecting corresponding points 1104 on the projected image 510' is implemented, in another embodiment, by the processor 104.

From the foregoing description, it will be recognized by those skilled in the art that a system for adjusting a projected image has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A system for manipulating a projected image on a surface, said system comprising:
   a workstation in communication with a processor;
   a camera in communication with said processor, said camera is capable of viewing said surface; and
   a projector in communication with said processor, said projector is capable of projecting onto said surface;
   wherein said processor is programmed to execute the following steps:
   (a) acquire from said camera an initial image,
   (b) obtain an initial graphic to be projected onto said surface,
   (c) acquire an initial overlay image that is a combination of said initial image and said initial graphic,
   (d) manipulate said initial graphic to produce a manipulated initial graphic and then acquire a manipulated overlay image that is a combination of said manipulated initial graphic and said initial image to obtain a selected position, orientation, and/or scale of said manipulated initial graphic,
   (e) cause a projected graphic to be projected by said projector at said selected position, orientation, and/or scale, wherein said projected graphic is said manipulated initial graphic after projection,
   (f) acquire from said camera an updated image, said updated image includes a representation of said projected graphic on said surface, and
   (g) adjust said projected graphic such that said projected graphic coincides with said manipulated initial graphic.

2. The system of claim 1, further comprising:
   an enclosure, said enclosure is hermetically sealed;
   wherein said camera includes components susceptible to damage from weather, said camera components are enclosed in said enclosure;
   wherein said projector includes components susceptible to damage from weather, said projector components are enclosed in said enclosure; and
   a communication module, said communication module is in communication with said processor, said communication module includes components susceptible to damage from weather, said communication module components are enclosed in said enclosure.

3. The system of claim 2, further comprising a heat sink affixed to said enclosure,
   wherein an outer surface of said heat sink is external to said enclosure,
   wherein said heat sink outer surface is capable of radiating heat, and
   wherein said heat sink is in thermal communication with said projector.

4. The system of claim 3, further comprising a heat exchanger enclosed in said enclosure,
   wherein said heat exchanger is adjacent to said projector and to said heat sink,
   wherein said heat exchanger is in thermal communication with said projector and said heat sink, and
   wherein said heat sink is a metal block that includes a top surface, and wherein said heat sink top surface is a floor of said enclosure.

5. The system of claim 1, wherein said processor steps (a) through (g) are a calibration process, and wherein said manipulated initial graphic is a closed geometric shape, and wherein step (g) of adjusting said projected graphic includes causing a projector drive to shift said projector an on X-Y axis such that said projected graphic is moved on said surface.

6. The system of claim 1, wherein said processor steps (a) through (g) are a calibration process, wherein said manipulated initial graphic is a closed geometric shape, and wherein step (g) of adjusting said projected graphic includes causing a projector drive to adjust lens elements in the projector, such that the size or shape of said projected graphic is altered.

7. The system of claim 1, wherein said program step (g) includes repeating steps (d) through (f) until said projected graphic coincides with said manipulated initial graphic.

8. The system of claim 1, wherein step (g) includes the substeps of:
   (g-1) selecting n graphic points on said manipulated graphic, wherein n is an integer greater than 1;
   (g-2) selecting n corresponding image points on said representation of said projected graphic in said updated surface image, and
   (g-3) comparing the relative location of each of said n graphic points on said manipulated graphic to its corresponding image point on said representation of said projected graphic in said updated surface image.

9. The system of claim 8, wherein said n graphic points are 2 graphic points, wherein said n graphic points are at a perimeter of said projected graphic.

10. A system for calibration of image projection onto a surface, said system comprising:
    a camera in communication with a first processor, said camera is capable of viewing said surface; and
    a projector in communication with said first processor, said projector is capable of projecting onto said surface;
    wherein said first processor is programmed to execute a process to:
    (a) acquire from said camera a first surface image,
    (b) create a projected frame, wherein said projected frame is a portrayal of a two-dimensional closed geometric figure with a specified position and scaling on said first surface image,
    (c) transmit said projected frame to said projector, such that said projector projects said projected frame on to said surface,
    (d) acquire from said camera an updated surface image, said updated surface image includes a representation of said projected frame on said surface,
    (e) adjust said projected frame such that said projected frame and said representation of said projected frame in said updated surface image are merged and superposed with one another,
    (f) create an initial graphic, wherein said initial graphic has a specified position and scaling inside said projected frame, and (g) transmit said initial graphic to said projector such that said initial graphic is projected inside said projected frame.

11. The system of claim 10, further comprising a workstation, said workstation is in communication with said first processor, said workstation is interactive to allow a user to create and transmit said initial graphic to said processor.

12. The system of claim 10, wherein said two-dimensional closed geometric figure is a rectangle.

13. A method for adjusting a projected image, comprising:
(a) acquiring a first surface image of a surface,
(b) creating a manipulated graphic, wherein said manipulated graphic is a portrayal of an initial graphic with a specified position and scaling on said first surface image,
(c) projecting said manipulated graphic on to said surface as a projected graphic,
(d) acquiring an updated surface image of said surface, said updated surface image includes a representation of said projected graphic on said surface,
(e) selecting graphic points on said projected graphic,
(f) selecting corresponding image points on said representation of said projected graphic in said updated surface image,
(g) determining displacements of said graphic points from said corresponding image points, and
(h) adjusting said projected graphic such that said manipulated graphic merges with said representation of said projected graphic in said updated surface image.

14. The method of claim 13, wherein steps (d) (e), (f), (g), and (h) are performed using a processor.

15. The method of claim 14, wherein said steps are performed in the order listed, and wherein said step (d) is not performed by said processor until receiving an instruction from a user.

16. The method of claim 14, wherein said first and updated surface images are acquired from said surface at a substantially different angle than from where said manipulated graphic is projected on to said surface.

17. The method of claim 14, further comprising repeating steps (c) through (h) until no displacement exists between said graphic points and said corresponding image points.

18. The method of claim 13, wherein said graphic points are on a perimeter of said projected graphic, and wherein said corresponding image points are on a perimeter of said representation in said updated surface image.

19. The method of claim 13, comprising an additional step performed before step (b) of selecting said graphic from a database of premade graphics.

20. The method of claim 13, wherein said surface includes portions that are not co-planar with one another, and wherein step (f) includes selecting at least two corresponding image points on a border between two non-coplanar portions of said surface.

* * * * *